(12) United States Patent
Furuya

(10) Patent No.: US 8,305,610 B2
(45) Date of Patent: Nov. 6, 2012

(54) METHOD FOR CHANGING PRINTER DRIVERS IN INFORMATION PROCESSING APPARATUS

(75) Inventor: Tomoyuki Furuya, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 659 days.

(21) Appl. No.: 12/159,955

(22) PCT Filed: Mar. 6, 2007

(86) PCT No.: PCT/JP2007/054757
§ 371 (c)(1),
(2), (4) Date: Jul. 2, 2008

(87) PCT Pub. No.: WO2007/108340
PCT Pub. Date: Sep. 27, 2007

(65) Prior Publication Data
US 2009/0268234 A1   Oct. 29, 2009

(30) Foreign Application Priority Data
Mar. 17, 2006 (JP) .................................. 2006-075551

(51) Int. Cl.
*G06F 3/12* (2006.01)
(52) U.S. Cl. ...... 358/1.15; 358/1.1; 358/1.13; 358/1.14; 358/1.18; 358/1.9; 358/448
(58) Field of Classification Search .................. None
See application file for complete search history.

(56) References Cited

U.S. PATENT DOCUMENTS

| | | | | |
|---|---|---|---|---|
| 5,982,996 A * | 11/1999 | Snyders | ........................ | 358/1.15 |
| 6,442,595 B1 * | 8/2002 | Kelly | ............................ | 709/206 |
| 6,570,668 B1 | 5/2003 | Misner | ........................ | 358/1.15 |
| 7,920,280 B2 * | 4/2011 | Furuya | ........................ | 358/1.13 |
| 2003/0051069 A1 * | 3/2003 | Iida | ............................... | 709/321 |
| 2006/0023244 A1 | 2/2006 | Mitsui | ........................ | 358/1.13 |

FOREIGN PATENT DOCUMENTS

| | | |
|---|---|---|
| EP | 1 621 995 A2 | 2/2006 |
| JP | 11-184656 A | 7/1999 |
| JP | 2000-353081 A | 12/2000 |

(Continued)

OTHER PUBLICATIONS

Daniel Emerson, "Advances in Windows Printing", (TWPRO5001_WinHEC05.ppt) Digital Documents Platform and Solutions, Microsoft Corporation (2004).

(Continued)

*Primary Examiner* — Marivelisse Santiago Cordero
*Assistant Examiner* — Aaron R Gerger
(74) *Attorney, Agent, or Firm* — Fitzpatrick, Cella, Harper & Scinto

(57) ABSTRACT

The information processing apparatus according to the present invention is an information processing apparatus comprises a determination unit that determines whether a combination of a source application and a destination printer driver is a combination of a first type application and a first type printer driver or a combination of a second type application and a second type printer driver; and a changing unit that changes the printer driver properties referenced by an operating system to properties value that satisfies the combinations in the event that the determination unit determines that the source application and the destination printer driver are neither of the combinations.

15 Claims, 17 Drawing Sheets

FOREIGN PATENT DOCUMENTS

| | | |
|---|---|---|
| JP | 2001-034444 A | 2/2001 |
| JP | 2001-075762 A | 3/2001 |
| JP | 2002-351646 A | 12/2002 |
| JP | 3618688 B2 | 2/2005 |
| JP | 2005-258895 A | 9/2005 |
| JP | 2006-065839 A | 3/2006 |

OTHER PUBLICATIONS

International Preliminary Report on Patentability, Written Opinion, and Jun. 12, 2007 International Search Report in PCT/JP2007/054757.

* cited by examiner

PRIOR ART

PRIOR ART

FIG. 8

|  | Win32 APPLICATION (201) | WinFx APPLICATION (211) |
|---|---|---|
| GDI PRINTER DRIVER (203) | APPROPRIATE | INAPPROPRIATE |
| XPS PRINTER DRIVER (213) | INAPPROPRIATE | APPROPRIATE |

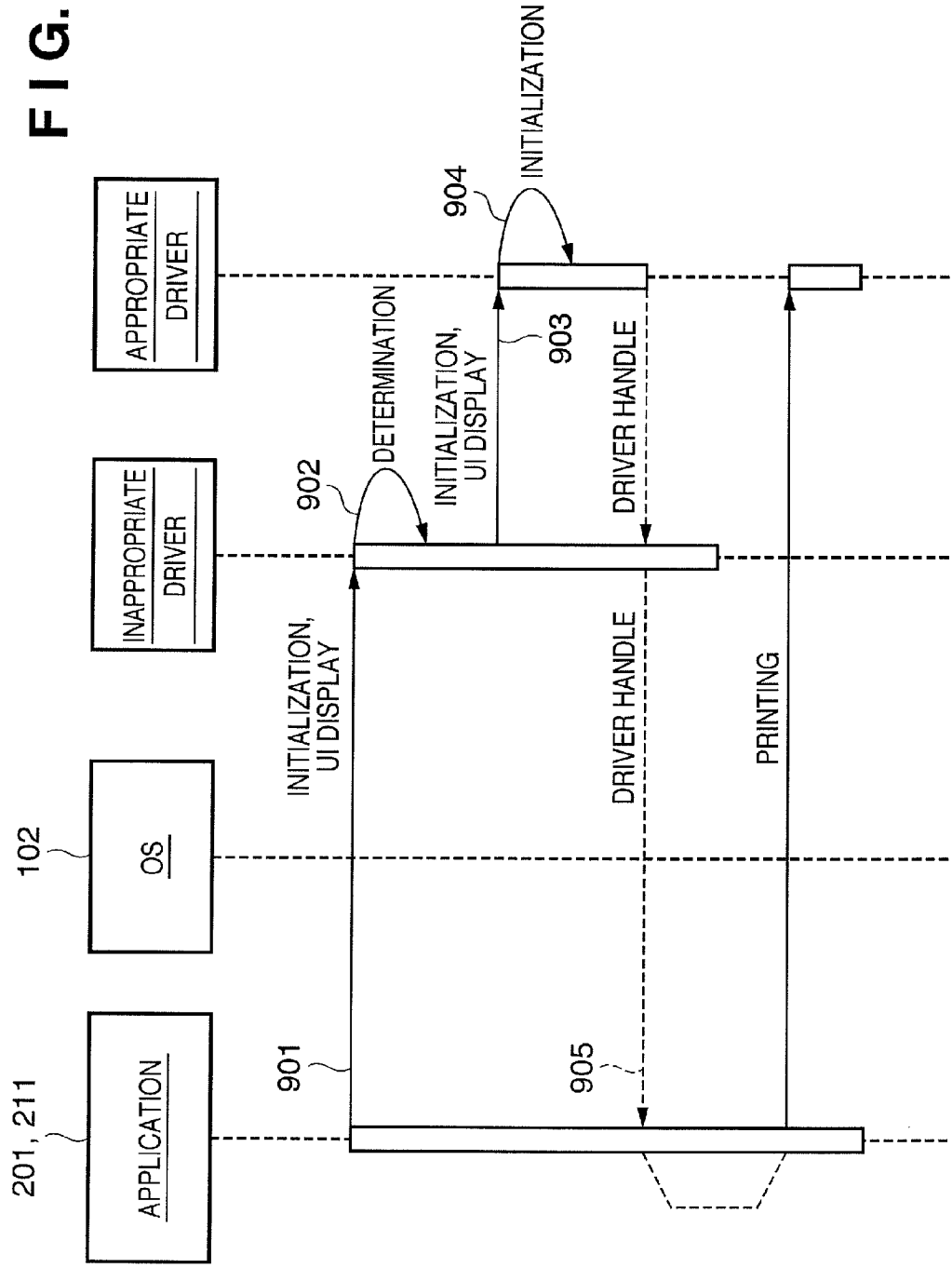

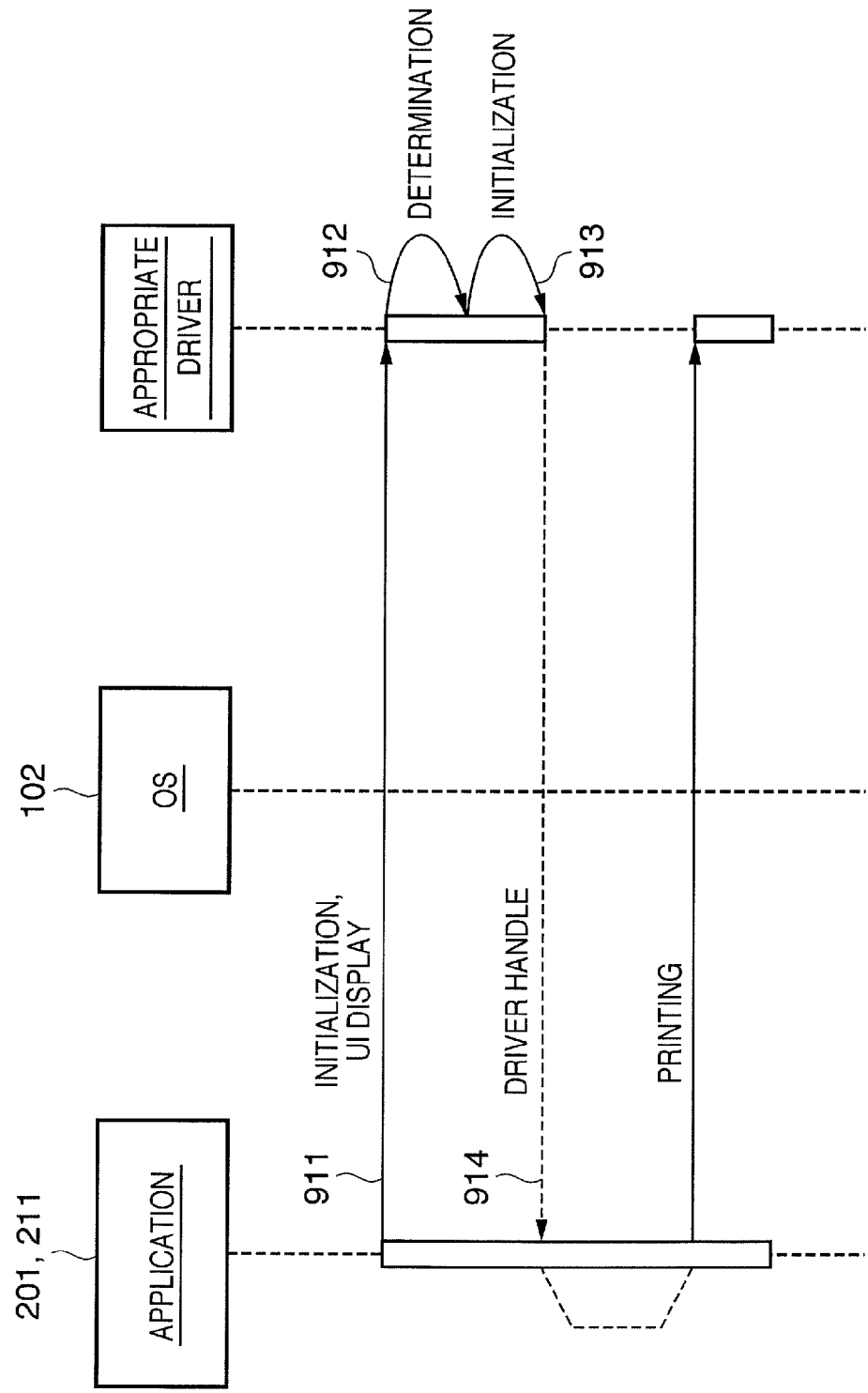

METHOD FOR CHANGING PRINTER DRIVERS IN INFORMATION PROCESSING APPARATUS

TECHNICAL FIELD

The present invention relates to an information processing apparatus capable of performing print processing and the like using, for instance, a plurality of different graphics engines, and a method for changing printer drivers in the information processing apparatus.

BACKGROUND ART

In order to print images and texts from an application executed by a host computer using a print apparatus, an operating system is generally provided with a configuration such as that shown in FIG. 3. More specifically, an application 101 hands over graphics data to a graphics engine 103, and the graphics data is processed by the graphics engine 103 before being handed over to a printer driver 104. The printer driver generates print data (generally referred to as PDL [Page Description Language]) corresponding to a print apparatus. The print data is stored in a spooler 105, and then sent to a print apparatus 1500.

In particular, the graphics engine 103 performs processing of graphics data such as converting the dimension of graphics data created by the application 101 or simulation processing according to the throughput of the printer driver 104. Therefore, the application 101 and the printer driver 104 are both capable of independent operation. The graphics engine 103 is normally provided as a part of an OS (operating system) 102.

On the other hand, the number of graphics engines 103 is not necessarily limited to one. Some configurations (OSs) allow two or more graphics engines to coexist.

For instance, a hardware engineering conference titled WinHEC-2005 was hosted by Microsoft Corporation in 2005 in Seattle, USA. At the conference, Microsoft's new OS (named Windows [registered trademark] Vista) was introduced as having a configuration in which two graphic engines coexist, as shown in FIG. 1 (Daniel Emerson, "Advances in Windows Printing", WinHEC 2005 Conference (TWPR05001_WinHEC05.ppt)).

Microsoft's conventional printing systems use a graphics engine called GDI (Graphic Device Interface) through an application (hereinafter referred to as a Win32 application) using an API (Application Programming Interface) referred to as a Win32 API, where print data is created from graphics data by a printer driver (hereinafter referred to as a GDI printer driver) called from the GDI. In the present embodiment, this print processing flow shall be referred to as a GDI print path.

For Windows Vista, a new print processing flow, referred to as an XPS print path, will be provided in addition to the conventional GDI print path. For the XPS print path, a graphic engine called a WPF (Windows Presentation Foundation) is provided by the OS through an application (hereinafter referred to as a WinFx application) using an API called WinFx API. The WPF graphics engine hands over XPS (XML Paper Specification) format graphics data to a printer driver (hereinafter referred to as an XPS printer driver), whereby the printer driver converts the graphics data to print data.

The GDI and WPF graphics engines are also capable of collaborating with each other. This collaboration enables graphics data to be handed over from a Win32 application to the XPS printer driver, or from a WinFx application to the GDI printer driver.

In order to make this collaboration work, when printing from a WinFx application using the GDI printer driver, graphics data is first converted into XPS format graphics data by the WPF graphics engine, and then from XPS format graphics data to EMF format graphics data. The converted graphics data is stored in an EMF spool file, and subsequently converted into print data by the GDI driver.

In addition, when printing from a Win32 application using the XPS printer driver, graphics data is first converted into EMF format graphics data by the GDI graphics engine, and then from EMF format graphics data to XPS format graphics data. The converted graphics data is stored in an XPS spool file, and subsequently converted into print data by the XPS printer driver.

As described, four print processing flows are provided in Windows Vista. Thus, print processing from both Win32 applications and WinFx applications may be realized by preparing either one of a GDI printer driver or an XPS printer driver.

However, since the XPS format and the EMF format differ from each other, conversion of graphics data formats has problems in terms of print quality, print functions, print speed and the like.

For instance, graphics data containing logic operations such as ROP operations (or raster operation processing operations), which is supported in EMF format, is not supported in XPS format. Therefore, depending on specifications specified by Microsoft Corporation, there is a risk that logic operation information may be lost from graphics data containing logic operations when undergoing conversion by a GDI-GPS conversion module that converts EMF format into XPS format. When graphics data, from which logic operation information is removed, is handed over to the XPS printer driver, the XPS printer driver may not be able to create the output result intended by the Win32 application.

Conversely, sophisticated graphics data that is supported in XPS format is not supported in EMF format. For this reason, when performing conversion using an XPS-GDI conversion module that converts XPS format into EMF format, such graphics data is converted into localized bitmaps in a process called flattering. In this case, since graphics data is converted into bitmap data, the GDI printer driver will be unable to determine original object properties, and therefore will be unable to create an output result corresponding to the object properties. In other words, quality of images output through data format conversion will deteriorate. For instance, when printing multiple pages per sheet using a printer driver, since data converted into bitmaps will be scaled down and arranged, image quality will be lower than a case in which a graphical object is drawn in a reduced size.

Furthermore, for instance, electronic signature information that is supported in XPS format is not supported in EMF format. Moreover, processing that is supported in EMF format, in which information from an application is directly conveyed to the GDI printer driver, is not supported in XPS format. Therefore, when a conversion from XPS format to EMF format or vice versa is performed in the event that graphics data in the pre-conversion format contains instructions using functions which are not supported in the post-conversion format, such functions will not be performed. In other words, functions that are not achievable when data format conversion processing is performed may exist in graphics data of respective formats.

Additionally, the occurrences of processing for GDI-XPS conversion or XPS-GDI conversion and the like may result in processing overhead, and therefore print processing speed may be reduced in comparison to processing paths that do not require conversion.

As described, when data format conversion is performed, problems arise in all of the aspects of quality, function and speed. Therefore, it is desirable to avoid print processing paths that involve data format conversion.

On the other hand, when both an XPS printer driver and a GDI printer driver for the same print apparatus are installed in a computer, the selection of the printer driver to be used is left to the user's discretion. In other words, in Windows (registered trademark) Vista, the graphics engines will not automatically select processing paths that do not require data format conversion. Furthermore, most users are not conscious of whether a certain application is a Win32 application or a WinFx application, and are unaware that four print processing flows exist. Therefore, when one printer driver is selected as a default printer driver, the selected printer driver will be used regardless of application type. As described, in print processing paths, avoiding data format conversion such as GDI-XPS conversion or XPS-GDI conversion may prove difficult.

DISCLOSURE OF INVENTION

The present invention has been made in consideration of the above conventional examples, and an object thereof is to solve the problems described above. In addition, another object of the present invention is to provide, in the event that a plurality of printer drivers are available for a printer, an information processing apparatus capable of performing print processing using a printer driver corresponding to a graphics engine used by an application regardless of which printer driver is selected, and a method for changing printer drivers at the information processing apparatus.

In order to achieve the above-described objects, the present invention is configured as follows. In other words, an information processing apparatus in which a first graphics processing unit that converts graphics data output from a first type application into first print information that is processible by a first type printer driver, and a second graphics processing unit that converts graphics data output from a second type application into second print information that is processible by a second type printer driver are operational, the information processing apparatus comprising:

a determination unit, adapted to determine, based on a type of a destination printer driver and a type of a source application, whether a combination of the source application and the destination printer driver is a combination of the first type application and the first type printer driver or a combination of the second type application and the second type printer driver; and a changing unit, adapted to change the destination printer driver used by the source application to a printer driver that satisfies the combinations in the event that said determination unit determines that the source application and the destination printer driver are neither of the combinations.

From a different point of view, the present invention is an information processing apparatus in which a first graphics processing unit that converts graphics data output from a first type application into first print information that is processible by a first type printer driver, and a second graphics processing unit that converts graphics data output from a second type application into second print information that is processible by a second type printer driver operate under the management of an operating system, and the operating system references a printer driver properties to convert, if necessary, the graphics data into print information processible by a printer driver of a type that corresponds to the referenced properties, the information processing apparatus comprising:

a determination unit, adapted to determine, based on a type of a destination printer driver and a type of a source application, whether a combination of the source application and the destination printer driver is a combination of the first type application and the first type printer driver or a combination of the second type application and the second type printer driver; and a changing unit, adapted to change the a printer driver properties referenced by the operating system to properties value that satisfies the combinations in the event that the determination unit determines that the source application and the destination printer driver are neither of the combinations.

According to the above-described configurations, in the event that a plurality of printer drivers are available for a printer, printing may be performed using a printer driver corresponding to a graphics engine used by an application regardless of which printer driver is selected.

Further features of the present invention will become apparent from the following description of exemplary embodiments (with reference to the attached drawings).

BRIEF DESCRIPTION OF DRAWINGS

FIG. 8 is a diagram showing criteria of determination performed by a combination determination unit of the user interface driver;

FIG. 9A is a diagram showing a sequence of a user interface driver according to a first embodiment;

FIG. 9B is a diagram showing a sequence of the user interface driver according to the first embodiment;

BEST MODE FOR CARRYING OUT THE INVENTION

[First Embodiment]
<Computer Configuration>

An embodiment of a print control apparatus according to the present invention will now be described. The print control apparatus is realized by a computer (information processing apparatus). An example of a software configuration of the computer will now be described. The hardware configuration of the computer is similar to that of a general-purpose computer, and includes a CPU, a memory, a user interface device (keyboard, display or the like), and a file storage device or the like.

Figure 1:
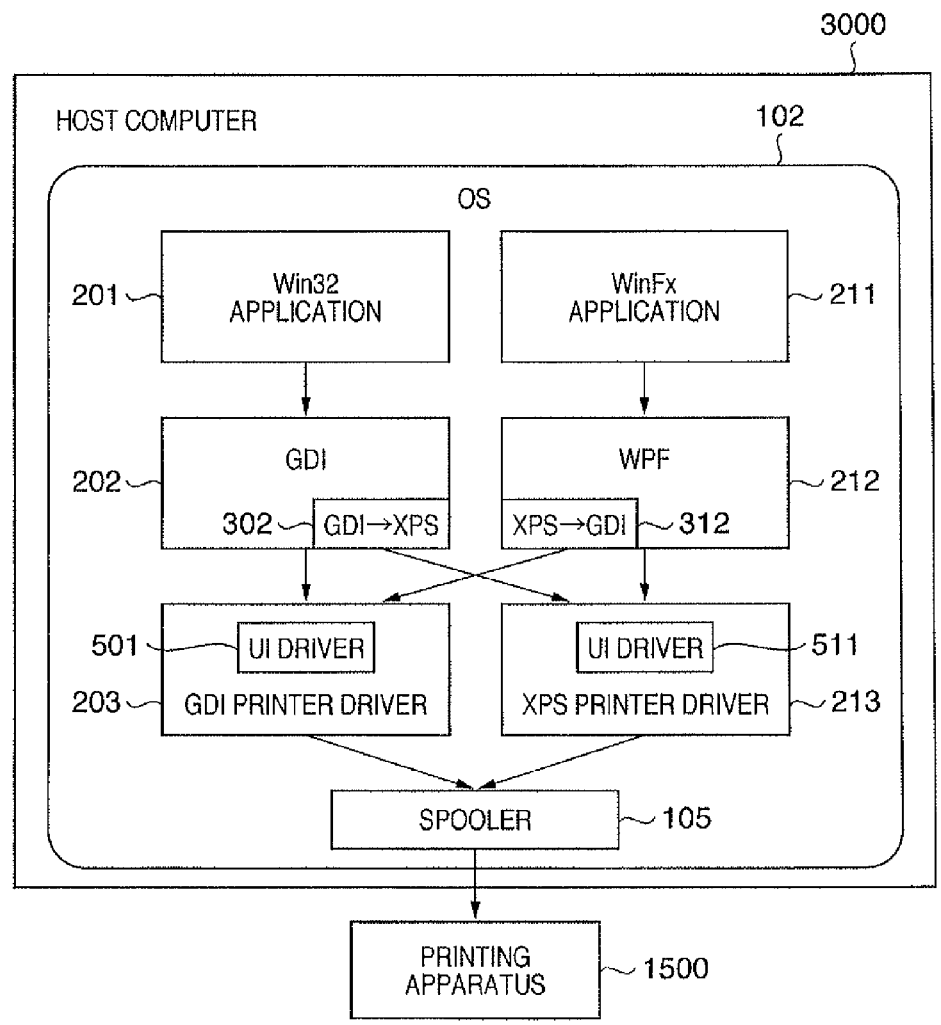
FIG. 1 is a diagram showing, as an example of coexistence of a plurality of graphics engines, a print processing flow and components corresponding to print processing according to Windows (registered trademark) Vista.

FIG. 1 shows a print processing flow and software components for print processing in Windows Vista, as an example of coexistence of a plurality of graphics engines. In Windows Vista, applications may be differentiated between two types of applications, namely: a Win32 application 201 that is a first type application, and a WinFx application 211 that is a second type application. Two graphics engines exist on an OS 102, namely: GDI 202 that is a first graphics processing unit, and WPF 212 that is a second processing graphics unit. The Win32 application 201 hands over a GDI function that is first graphics data to the GDI 202, and the WinFx application 211 hands over WPF API format data that is second graphics data to the WPF 212. In addition, printer drivers may be differentiated between two types of printer drivers, namely: a GDI printer driver 203 that is a first type printer driver, and an XPS printer driver 213 that is a second type printer driver. The GDI printer driver 203 receives graphics data from the GDI 202, and converts the graphics data into print data for a printing apparatus 1500. The XPS printer driver 213 receives graphics data from the WPF 212, and converts the graphics data into print data for the printing apparatus 1500. Print data created by the printer drivers are transmitted to the printing apparatus 1500 via a spooler 105.

In this specification, the print processing flow from the Win32 application 201 via the GDI 202 to the GDI printer driver 203, by which print data is created, shall be referred to as a GDI print path. Additionally, the print processing flow from the WinFx application 211 via the WPF 212 to the XPS printer driver 213, by which print data is created, shall be referred to as an XPS print path. Furthermore, the GDI print path and the XPS print path shall be referred to as straight print paths. However, print processing flows are not limited to the GDI print path and the XPS print path, and a print processing flow exists from the Win32 application 201 via the GDI 202 to the XPS printer driver 213, at which print data is created. In addition, there is also a print processing flow from the WinFx application 211 via the WPF 212 to the GDI printer driver 203, at which print data is created. These paths are realized by data format conversion performed by a GDI->XPS conversion unit 302 and an XPS->GDI conversion unit 312. Print paths in which the graphics engines convert data into each other's data format shall be referred to as crossed print paths.

An application and a printer driver forming respective ends of a print path are referred to as a source application and a destination printer driver, respectively.

Figure 2:
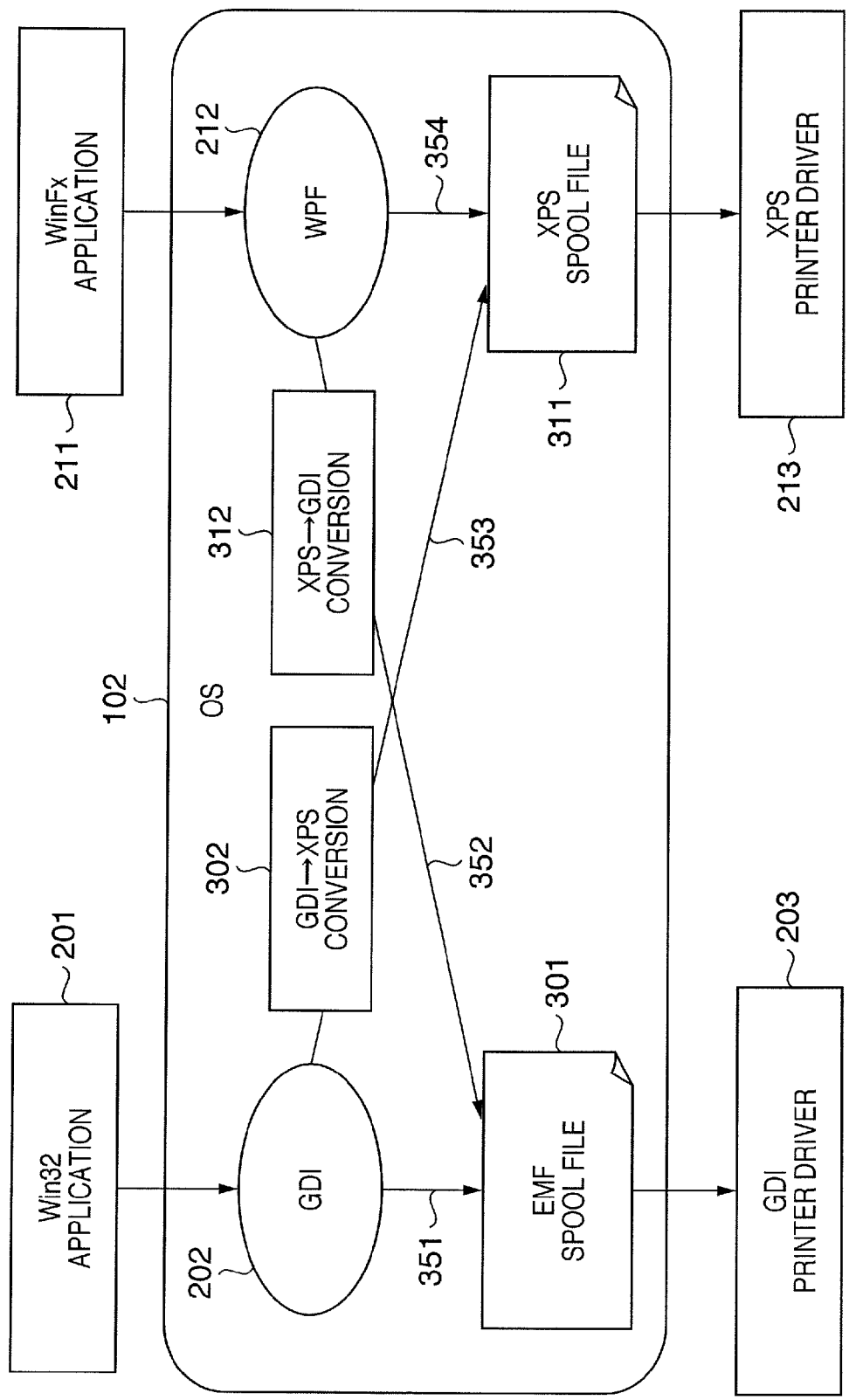
FIG. 2 is a diagram showing a mechanism of coexistence of two graphics engines according to Windows (registered trademark) Vista.
Figure 3:
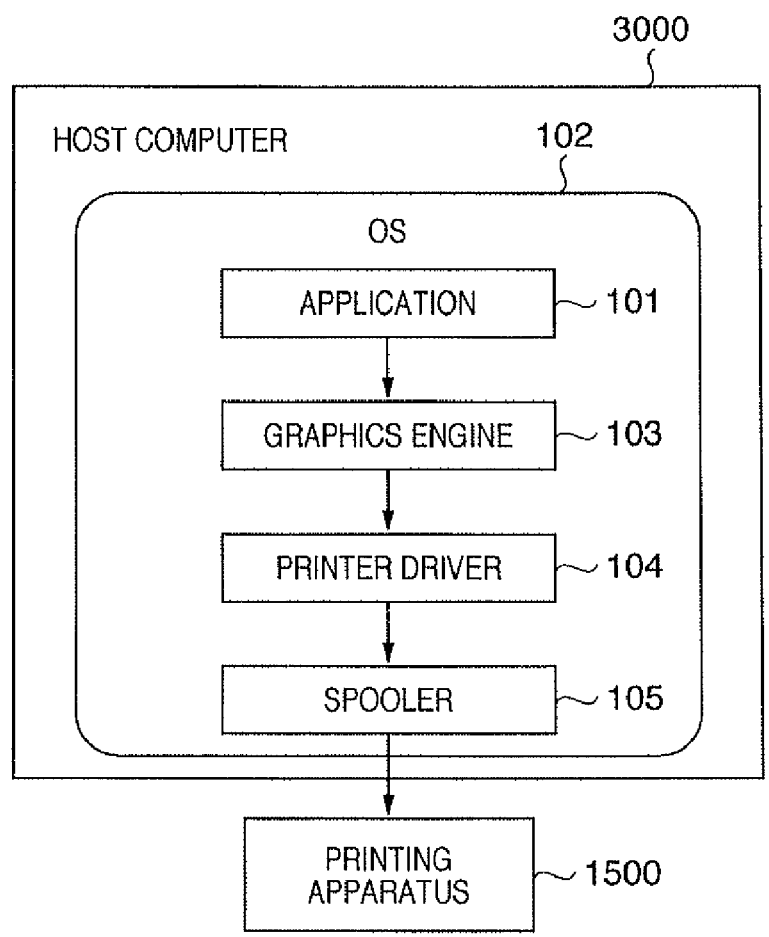
FIG. 3 is a diagram showing a general print processing flow and components corresponding to print processing.

A print processing flow will be described with reference to FIG. 2. FIG. 2 shows a mechanism of coexistence of two graphics engines in Windows (registered trademark) Vista. Four types of print processing paths exist in Windows (registered trademark) Vista, namely: paths 351, 352, 353 and 354.

The print processing path 351 represents a GDI print path. Graphics data handed over from the Win32 application 201 is stored by the GDI 202 in EMF (Enhanced Metafile) format as an EMS spool file. Conversion to print data is subsequently performed by the GDI printer driver 203.

The print processing path 354 represents an XPS print path that is added in Windows (registered trademark) Vista. Graphics data handed over from the WinFx application 211 is stored by the WPF 212 in an XPS spool file 311, and subsequently converted into print data by the XPS printer driver 213.

The print processing path 352 represents a print processing path in a case where data from the WinFx application 211 is printed by the GDI printer driver 203. Graphics data handed over from the WinFx application 211 is converted into EMF format graphics data at the XPS->GDI conversion module 312 via the WPF 212. The converted graphics data is stored in an EMF spool file, and subsequently converted into print data by the GDI driver 203.

The print processing path 353 represents a print processing path in a case where data from the Win32 application 201 is printed by the XPS printer driver 213. Graphics data handed over from the Win32 application 201 is converted into XPS format graphics data at the GDI->XPS conversion module 302 via the GDI 202. The converted graphics data is stored in an XPS spool file 311, and subsequently converted into print data by the XPS printer driver 213.

Figure 4:
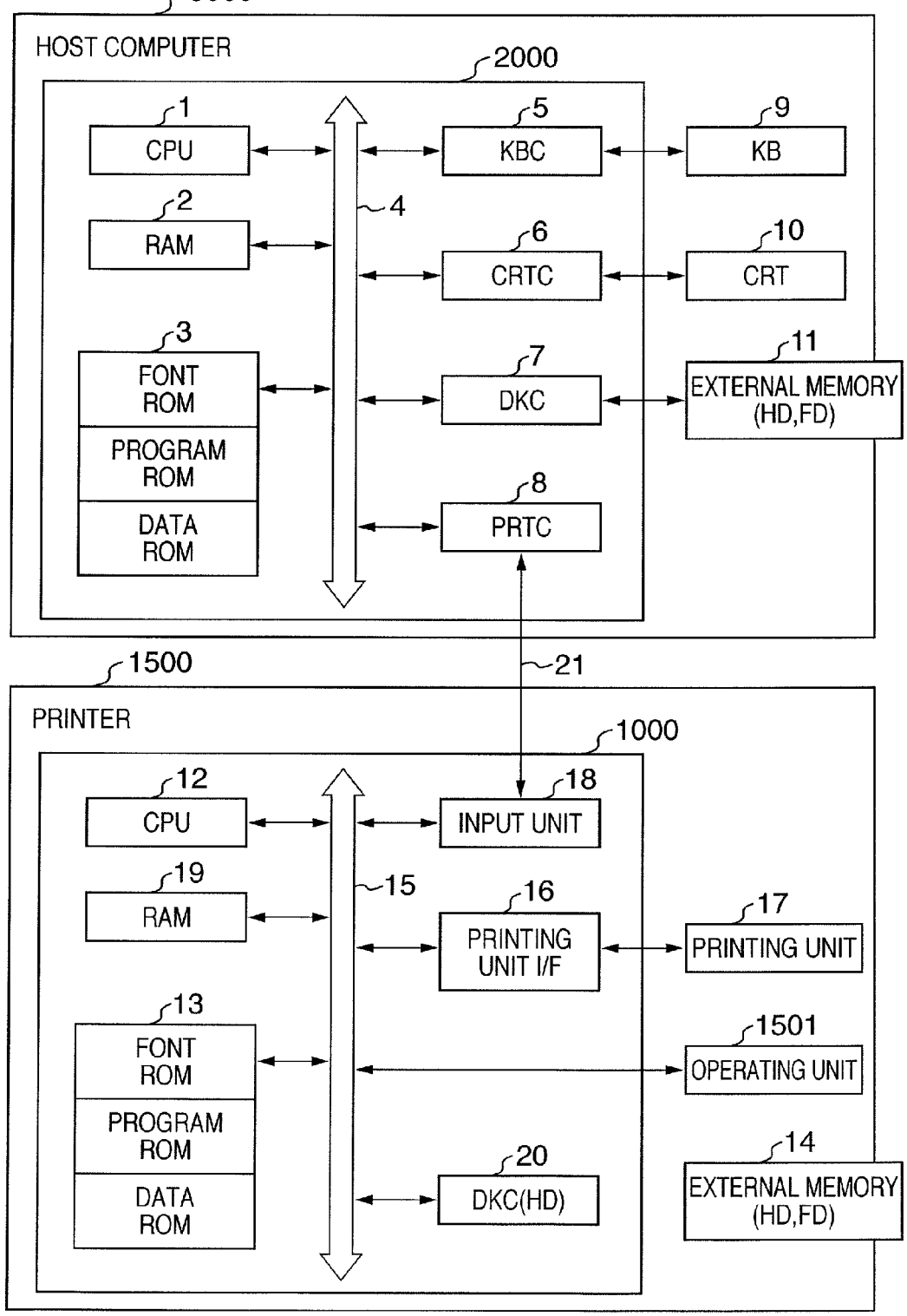
FIG. 4 is a block diagram showing an example of a configuration of an information processing system to which are applied a print control apparatus, a control method and a printer driver thereof according to embodiments of the present invention.

FIG. 4 is a block diagram describing a configuration of a print control system that includes a computer according to the present embodiment. Unless otherwise specified, the present invention may be applied to any system such as a stand-alone device, a system consisting of a plurality of devices, or a system connected via a network such as a LAN or a WAN and performs processing via the network, as long as functions of the present invention are executed.

In FIG. 4, a host computer 3000 is provided with a CPU 1 that performs processing of documents containing a mixture of diagrams, images, texts, tables (such as spreadsheets) and the like, based on a document processing program and the like stored in a program ROM of a ROM 3 or an external memory 11. The CPU 1 performs overall control of respective devices connected to a system bus 4.

The program ROM of the ROM 3 or the external memory 11 also stores an operating system program (hereinafter abbreviated as OS) or the like that is a control program of the CPU 1. A font ROM of the ROM 3 or the external memory 11 stores font data and the like used during the above-mentioned document processing, while a data ROM of the ROM 3 or the external memory 11 stores various data used during the above-mentioned document processing.

A RAM 2 functions as a main memory, a work area and the like for the CPU 1. A keyboard controller (KBC) 5 controls key input from a keyboard 9 or input from a pointing device, not shown. A CRT controller (CRTC) 6 controls display of a CRT display (CRT) 10. A disk controller (DKC) 7 controls access to the external memory 11 that is a hard disk (HD), a flexible disk (FD) or the like. The external memory 11 stores boot programs, various applications, font data, user files, editing files, printer control command generation programs (hereinafter referred to as printer drivers) and the like. The printer drivers according to the present invention are also stored in the external memory 11.

A printer controller (PRTC) 8 is connected to the printer 1500 via a predetermined bidirectional interface 21, and performs control processing of communication with the printer 1500. The CPU 1 enables WYSIWYG on the CRT 10 by, for instance, performing deployment (rasterization) processing of outline fonts on a display information RAM configured on the RAM 2.

In addition, the CPU 1 opens various registered windows based on commands instructed through a mouse cursor and the like, not shown, on the CRT 10, and executes various data processing. When performing printing, a user may open a window related to print settings to configure printer settings or settings of a print processing method including print mode selection for a printer driver.

At the printer 1500, a printer CPU 12 outputs an image signal as output information to a printing unit (printer engine) 17 connected to a system bus 15, based on a control program or the like stored in a program ROM of a ROM 13 or a control program or the like stored in an external memory 14.

In addition, the program ROM of the ROM 13 also stores a control program or the like for the CPU 12. A font ROM of the ROM 13 stores font data and the like that is used when generating the above-mentioned output information, while a data ROM of the ROM 13 stores information and the like used on the host computer in the event that the printer is not equipped with an external memory 14 such as a hard disk.

The CPU 12 is arranged so that processing of communication with the host computer is enabled via an input unit 18, and information and the like within the printer is notifiable to the host computer 3000. A RAM 19 functions as a main memory, a work area and the like for the CPU 12. The RAM 19 is configured so that memory expansion may be performed by means of an optional RAM connected to an expansion port, not shown. The RAM 19 is used as an output information deployment area, an environmental data storage area, and an NVRAM or the like. Access to the above-mentioned external memory 14 that is a hard disk (HD), an IC card or the like is controlled by a memory controller (MC) 20.

The external memory 14 is optionally connected to store font data, emulation programs, form data and the like. In addition, switches for operations, LED display devices and the like are arranged on an operating panel 18. Furthermore, the above-mentioned external memory need not be limited to one. Alternatively, one or more external memories may be provided so that, in addition to internal fonts, pluralities of optional font cards and external memories storing programs that interpret printer control languages of different language systems may be connected. Moreover, a NVRAM, not shown, may be provided to store printer mode setting information from an operating panel 1501.

<Detailed Configuration of the Drivers>

Figure 5:
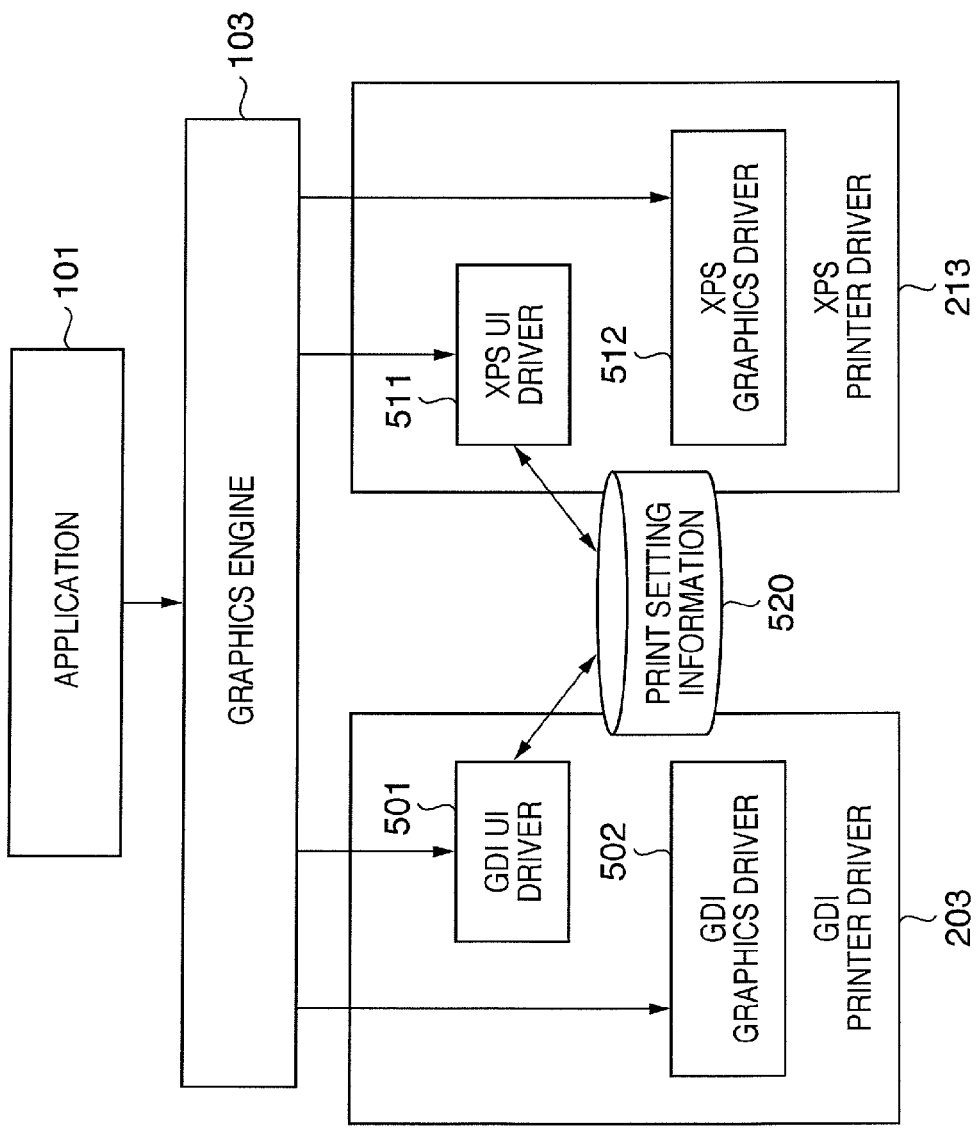
FIG. 5 is a diagram showing configurations of a GDI printer driver and an XPS printer driver in relation to the embodiments.

FIG. 5 is a diagram showing configurations of the GDI printer driver 203 and the XPS printer driver 213 in relation to the present embodiment. In FIG. 5, descriptions on applications and graphics engines have been omitted, and the case of a single application and a single graphics engine is shown. It is needless to say that, as shown in FIG. 1, graphics data in formats respectively corresponding to each printer driver is handed over by the graphics engines. In the present embodiment, with respect to the printing apparatus 1500, both the GDI printer driver 203 and the XPS printer driver 213 are installed in an OS 102. In other words, the GDI printer driver 203 and the XPS printer driver 213 share the same printer as their output destinations.

The GDI printer driver 203 is composed of a GDI UI (or user interface) driver 501 and a GDI graphics driver 502. The GDI user interface driver 501 stores contents displayed on a user interface of the printer driver and print setting information 520 input by the user into a registry. The GDI graphics driver 502 receives corresponding graphics data (DDI [Device Driver Interface] functions) from a graphics engine 103, and creates print data from the graphics data according to print setting information 520 stored in the GDI user interface driver 501.

The XPS printer driver 213 is composed of an XPS user interface driver 511 and an XPS graphics driver 512. The XPS user interface driver 511 stores contents displayed on a user interface of the printer driver and print setting information 520 inputted by the user into a registry. The XPS graphics driver 512 receives corresponding graphics data (XPS data) from the graphics engine 103, and creates print data from the graphics data according to print setting information 520 stored in the XPS user interface driver 511.

While the GDI user interface driver 501 and the XPS user interface driver 511 are described as being separate components, a single common user interface driver equipped with functions and interfaces of both user interface drivers may alternatively be used. In this case, the GDI printer driver 203 will be composed of the common user interface driver and the GDI graphics driver 502, while the XPS printer driver 213 will be composed of the common user interface driver and the XPS graphics driver 512.

Figure 6:
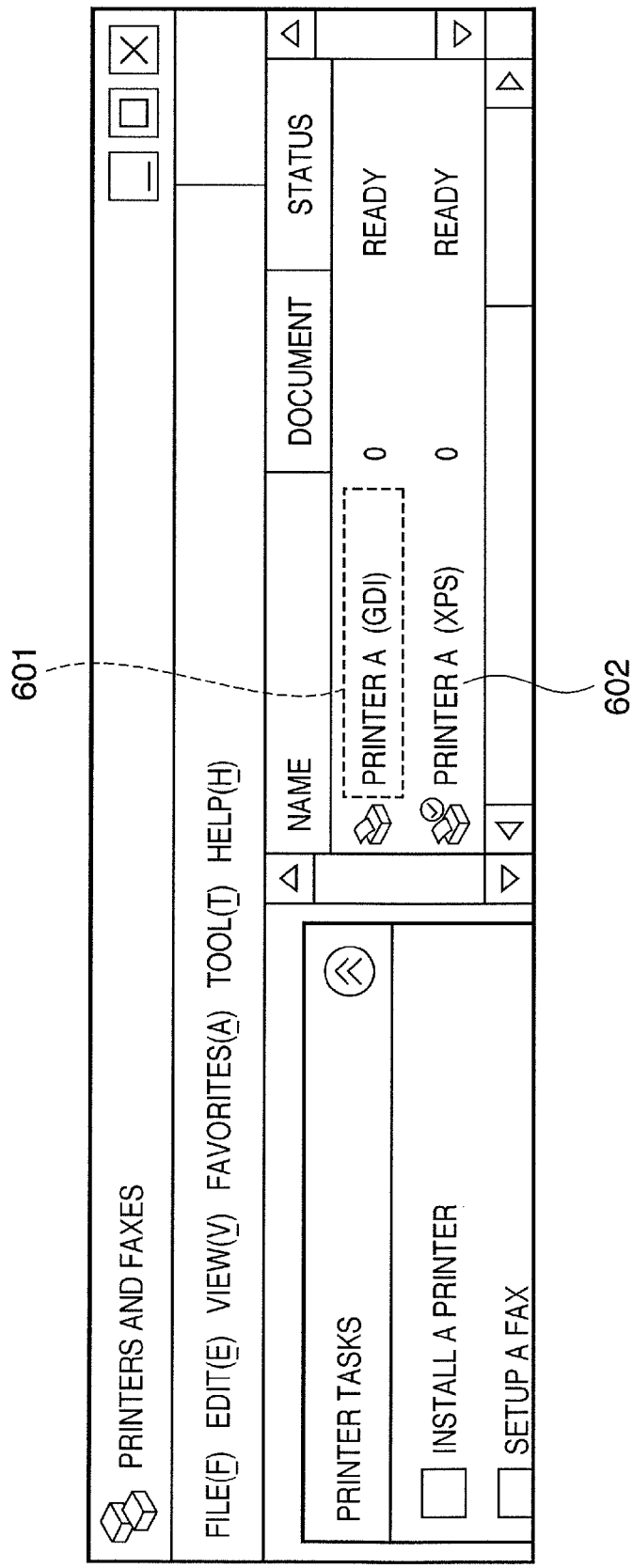
FIG. 6 is a diagram showing a situation in which both a GDI printer driver and an XPS printer driver in relation to the embodiments have been installed.

FIG. 6 shows an example of a window showing the status of a printer in a situation in which both the GDI printer driver and the XPS printer driver in relation to the present embodiment have been installed. As shown in FIG. 6, with respect to a single printing apparatus (for example, a printer A), the GDI printer driver 203 is registered as "Printer A (GDI)" 601. At the same time, with respect to the same printer A, the XPS printer driver 213 is registered as "Printer A (XPS)". As seen, two printer drivers, namely, the GDI printer driver 203 and the XPS printer driver 213, exist with respect to a single printing apparatus. Incidentally, a Microsoft Windows (registered trademark) OS allows a user to select a default printer driver. For a printer driver selected as a default printer driver, information indicating the selection is stored by the operating system so as to be accessible. When printing is to be performed from an application and an instruction for printing is given, a print setting user interface of the application is normally displayed. The user is then able to select a printer driver from the user interface of the application. If no selection is made, the default printer driver is selected, and printing will be performed using that printer driver. FIG. 6 shows that a "Printer A (XPS)" 602 has been selected as the default printer driver.

<Configuration and Operations of a User Interface Driver>

Figure 7:
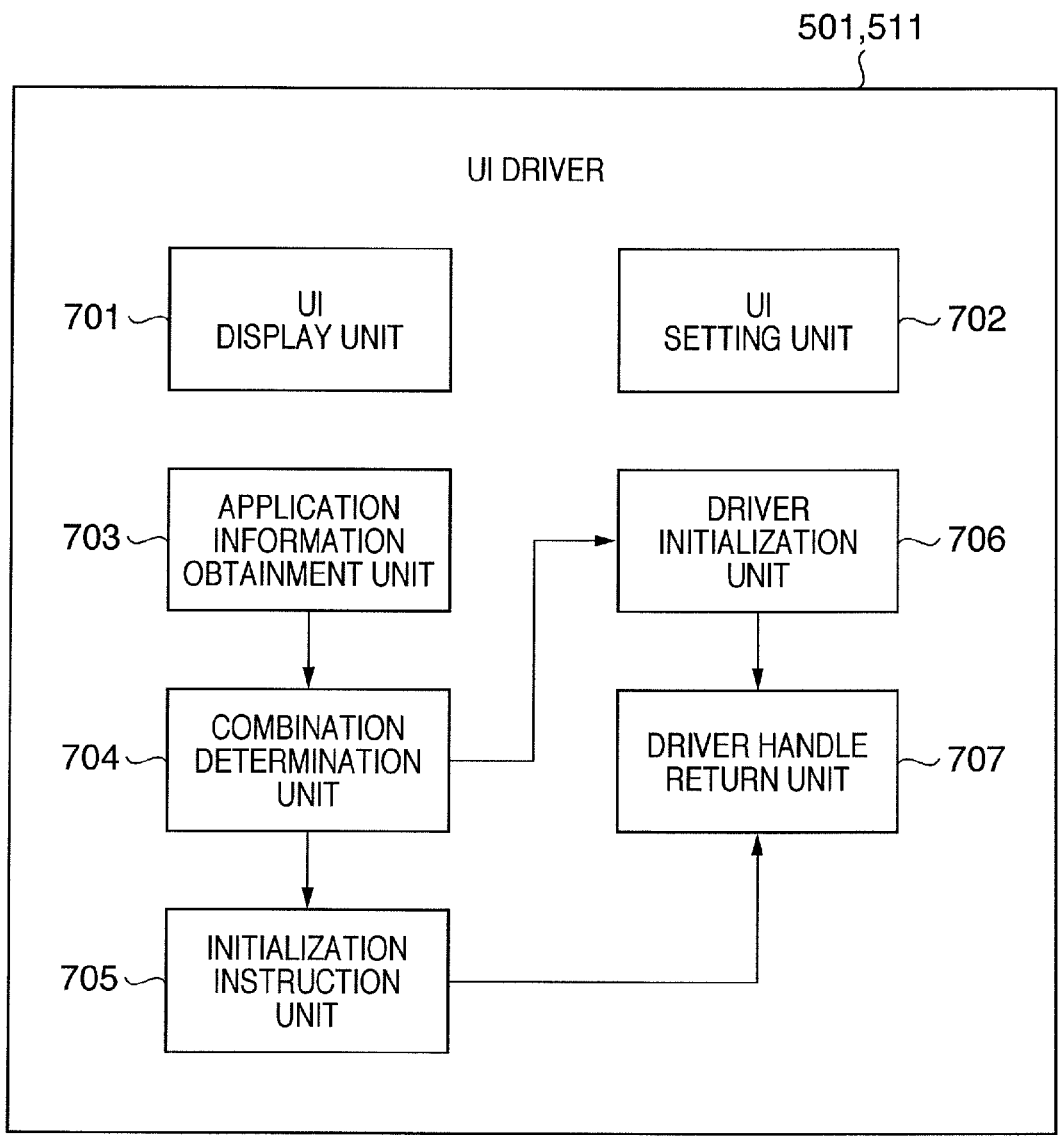
FIG. 7 is a diagram showing a configuration of a user interface driver according to the embodiments.

FIG. 7 is a diagram that best represents the characteristics of the present invention, and shows configurations of a user interface driver 501 and a user interface driver 511 according to the first embodiment. In the first embodiment, the GDI graphics driver 502 and the XPS graphics driver 512 do not perform any special processing, and merely operate as general graphics drivers. The GDI user interface driver 501 and the XPS user interface driver 511 or the common user interface driver (hereinafter collectively referred to as user interface driver) perform processing characteristic of the present embodiment.

As shown in FIG. 7, the user interface drivers 501, 511 according to the present embodiment receive initialization instructions from the applications 201, 211 or the graphics engines 202, 212. In response thereto, the user interface drivers 501, 511 acquire information on whether the application calling the user interface driver is the Win32 application 201 or the WinFx application 211 through an application information obtainment unit 703.

The user interface drivers according to the present embodiment receive initialization instructions from the applications 201, 211 or the graphics engines 202, 212. In response thereto, the user interface drivers 501, 511 acquire a name of an application 101 that is calling the user interface driver using the application information obtainment unit 703. In addition, the user interface drivers 501, 511 also acquire information (i.e. application type information) on whether the application is the Win32 application 201 or the WinFx application 211. In the present embodiment, a process name (executable file name) calling the user interface driver may be acquired by using a GetModuleFileName function or the like provided by the Win32 API. Additionally, determination of whether the application calling the user interface driver is the Win32 application 201 or the WinFx application 211 may be performed as follows. More specifically, a DLL (Dynamic Link Library), which is imported by an executable file of which the name was acquired by the above-mentioned function, is acquired from a header portion retained by the executable file. Then, a determination is made on whether a module unique to the WinFx application exists within the imported DLL. For instance, the module may be determined to be a WinFx unique module by tabulating and storing WinFx-unique module names in advance, and when a search performed on module names acquired from the table results in a hit.

Determination of whether an application is the Win32 application 201 or the WinFx application 211 is performed in this manner. In addition to the above, for instance, if the OS provides an API that conveys application types, application type information may be acquired using the API. Alternatively, a method may be adopted in which a user interface driver stores an application table storing application names or type information indicating whether an application is a Win32 application or a WinFx application in association with process names (executable file names). For the purpose of maintenance of the application table, this method is desirably arranged so that a maintenance user interface is displayed and the application table may be updated through user input. The user interface driver uses a GetModuleFileName function and the like to acquire a name of a process calling the user interface driver, and uses the process name to search the application table. A hit will mean that the application name corresponding to the relevant process name is the name of the application that called the user interface driver. In addition, the application type corresponding to the relevant process name is the type of the application that called the user interface driver.

Application types may also be determined using a method such as that described below. A Win32 application attempts to acquire print setting information from the user interface driver in a format called DEVMODE. On the other hand, a WinFx application attempts to acquire print setting information from the user interface driver in a format called Print Ticket. The user interface driver is capable of creating print setting information in either format. Thus, an application type may be determined based on such an acquisition request.

Next, a determination is made by a combination determination unit 704 on whether the combination of the application and the user interface driver called by the application is appropriate. The criteria used for this determination is shown in FIG. 8. An appropriate result means that the graphics engine and the printer driver to be used by the application are consistent. In other words, in this case, there is no need to perform conversion (for instance, EMF-XPS conversion) on the format of the graphics data output from the graphics engine. Graphics engines to be used by applications are fixed according to application type. Therefore, a determination may be performed on whether a combination is appropriate if application type information and the printer driver selected by the application are known. Application types may be acquired in the manner described earlier. If information regarding a selection of a printer driver is stored on the computer, the selected printer driver may be identified by referencing such information. In addition, if information (an identifier or the like) of a printer driver to be used is handed over from the application that performs printing to the graphics engine and is referenceable by the user interface driver, the printer driver may be identified by referencing such information. Then, if an identifier of a printer driver may be referenced, the printer driver type (whether the printer driver is an XPS printer driver or a GDI printer driver) may be determined. For instance, by creating and storing in advance a table that associates names of printer drivers with type information thereof, a printer driver type may be determined by referencing the table. Incidentally, an "appropriate" combination may also be expressed as a combination of an application and a printer driver of the same type. Since the graphics engines also need to determine whether the types are the same in order to determine whether data format conversion is required, the same determination criteria may be adopted.

In the event that the combination determination unit 704 determines that the combination is inappropriate, an initialization instruction unit 705 issues an initialization instruction to an appropriate user interface driver configuring a straight path. An appropriate user interface driver is included in a printer driver corresponding to the same destination printer of a printer driver initially selected by the user, and at the same time is included in a printer driver that forms a straight path together with a graphics engine corresponding to the application. It is assumed that the GDI printer driver has information indicating whether an XPS printer driver that shares the same destination printer is installed in the information processing apparatus. Similarly, it is assumed that the XPS printer driver has information indicating whether a GDI printer driver that shares the same destination printer is installed in the information processing apparatus. In addition, if the user interface driver is a common user interface driver, the user interface driver obviously has information indicating whether a GDI graphics driver and/or an XPS graphics driver exist. This description assumes that the GDI user interface driver and the XPS user interface driver are configured as separate user interface driver modules.

Subsequently, a driver handle is received from the user interface driver that performed initialization processing in response to the initialization instruction. The driver handle from the user interface driver is received by a driver handle return unit 707. The driver handle return unit 707 transmits (hands over) the received driver handle to the application 201, 211 or the graphics engines 202, 212 from which the initialization instruction was issued to the user interface driver.

In the present embodiment, two drivers exist for each printer. Therefore, if one of the drivers is determined to be inappropriate, the other driver is selected as an appropriate driver. It is needless to say that an appropriate user interface driver may be selected using a table, for example, shown in FIG. 8, which will be described later. In addition, initialization processing includes, for instance, memory allocation, driver handle response and the like. A driver handle is an identifier used to uniquely identify a driver. The handle enables identification of user interface drivers and printer drivers.

Meanwhile, in the event that the combination determination unit 704 determines that a combination is appropriate, a driver initialization unit 706 performs initialization of a user interface driver as-is. The driver handle generated through initialization processing is returned by the driver handle return unit 707 to the application or the graphics driver that issued the initialization instruction.

The application or the graphics engine that receives the driver handle from the user interface driver activates a user interface driver that is identified by the driver handle that was handed over, and allows the user to input print settings. In addition, since the application or the graphics engine that receives the driver handle from the user interface driver outputs graphics data to the printer driver identified by the driver handle that was handed over, an appropriate printer driver that forms a straight print path performs print data conversion or, in other words, creates a print job. As seen, by having a user interface driver that receives an activation request hand over a driver handle that is appropriate for an application by which printing is to be performed, print processing capable of producing high-quality results may be performed in a speedy manner.

Incidentally, there may be cases in which a user interface display instruction is handed over to the user interface driver together with the initialization instruction of the driver to allow the user to perform print settings. In such a case, if the combination of the application and the printer driver is determined to be appropriate by the combination determination unit 704, a user interface dialog is displayed on a user interface display unit 701. The user changes print settings at a user interface setting unit 702 via the displayed UI. On the other hand, if the combination is determined to be inappropriate by the combination determination unit 704, the initialization instruction unit 705 issues a user interface display instruction in addition to a driver initialization instruction to an appropriate driver. In this manner, the user may change print settings using an appropriate driver.

FIG. 8 shows an example of criteria of determination performed by the combination determination unit of the user interface driver. A determination will result in "appropriate" in the event that the GDI printer driver 203 is selected when printing is to be performed from the Win32 application 201. Therefore, "appropriate" is registered in a corresponding field of a reference table shown in FIG. 8. This is due to the fact that the GDI graphics engine 202 is used during printing by the Win32 application 201, and the GDI printer driver 203 performs print processing as a straight print path using the GDI graphics driver 502. In addition, a selection of the XPS user interface driver 511 when printing from the Win32 application 201 will result in a determination of "inappropriate". Therefore, "inappropriate" is registered in a corresponding field. This is due to the fact that the GDI graphics engine is used during printing by the Win32 application 201, and the XPS printer driver 213 performs print processing as a crossed print path using the XPS graphics driver 512.

Similarly, a selection of the XPS printer driver 213 when printing from the WinFx application 211 will result in a determination of "appropriate". This is due to the fact that the WPF graphics engine 212 is used during printing by the WinFx application 211, and the XPS printer driver 213 performs print processing as a straight print path using the XPS graphics driver 512. In addition, a selection of the GDI user interface driver 501 when printing from the WinFx application 211 will result in a determination of "inappropriate". This is due to the fact that the WPF graphics engine 212 is used during printing by the WinFx application 211, XPS→GDI conversion 312 is performed, and the GDI printer driver 203 performs print processing as a crossed print path using the GDI graphics driver 502. Therefore, values according to determination results are registered for corresponding items.

By inscribing corresponding driver handles in the fields of the printer drivers 203, 213 in the table shown in FIG. 8, a driver handle appropriate for an application may be acquired from the table of FIG. 8.

FIGS. 9A and 9B are sequence diagrams of the user interface driver according to the first embodiment. In FIG. 9A, when an initialization instruction and a user interface display instruction 901 are handed over from an application, the combination determination unit 704 determines in step 902 whether the driver is a driver appropriate for the application that issued the initialization instruction. If the driver is determined to be inappropriate, the initialization instruction unit 705 in step 903 issues an initialization instruction and a user interface display instruction to a user interface driver appropriate for the application. Upon receiving the initialization instruction, the user interface driver performs initialization processing of the printer driver (graphics driver) in step 904, and returns a driver handle to the issuing source (i.e. user interface driver) of the initialization instruction. In step 905, the driver handle return unit 707 further returns the returned driver handle to the application. The application performs print processing using a printer driver corresponding to the driver handle. In this manner, printing may be performed by an appropriate graphics driver while avoiding so-called crossed print paths such as the processing path 352 or the processing path 353.

Meanwhile, in FIG. 9B, the user interface driver receives an initialization instruction and a user interface display instruction 911. In step 912, the combination determination unit 704 determines whether the user interface driver is appropriate for the issuing-source application of the initialization instruction. FIG. 9B shows that the driver is determined to be appropriate. In this case, the user interface driver receiving the initialization instruction performs initialization processing of a corresponding graphics driver in step 913, and returns the driver handle in step 914 to the issuing source of the initialization instruction or, in other words, the application. The application performs print processing using a printer driver corresponding to the driver handle. In this manner, printing may be performed by an appropriate graphics driver while avoiding so-called cross flows such as the processing path 352 or the processing path 353.

<Processing Procedure of User Interface Drivers>

Figure 10:
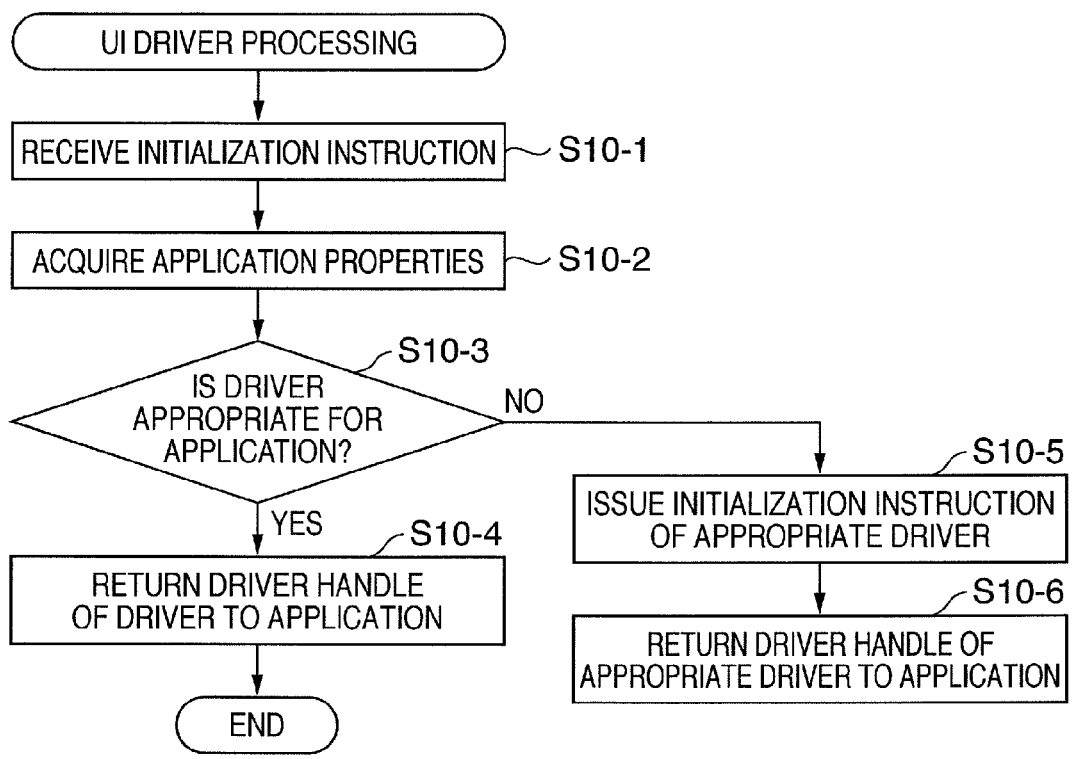
FIG. 10 is a flowchart showing a processing flow of the user interface driver according to the first embodiment when an initialization instruction is handed over to the user interface driver.

FIG. 10 is a flowchart showing a processing flow of the user interface drivers 501, 511 according to the first embodiment when an initialization instruction is handed over to the user interface drivers. When issuing print instructions to the applications 201, 211, the user issues instructions of the print settings of the printer driver by operating the applications 201, 211. The applications issue an initialization instruction and a user interface display instruction to a user interface driver of the specified printer driver. FIG. 10 shows processing performed by the user interface driver upon receiving the initialization instruction.

Firstly, in step 10-1, the user interface driver receives an initialization instruction. The user interface driver acquires a name of the application (executable file name) that called the user interface driver. Based on the acquired name, the user interface driver acquires information (type information) indicating type of application or, more specifically, indicating whether the calling application is a Win32 application or a WinFx application in step 10-2. This processing is as described with reference to FIG. 7. Based on the acquired application type information, the user interface driver determines in step 10-3 whether the printer driver including the user interface driver is appropriate for the application. This determination is performed, for instance, using the table shown in FIG. 8. If determined to be inappropriate, the user interface driver issues an initialization instruction to an appropriate driver in step 10-5. Then, in step 10-6, a driver handle returned from the appropriate driver is received and, in turn, returned to the application by the user interface driver.

In step 10-3, when it is determined that the printer is appropriate for the calling source application, the user interface driver initializes its own driver in step 10-4 and returns a driver handle created during the initialization to the application.

A printer driver that receives an initialization instruction from another printer driver also operates according to the procedure shown in FIG. 10. Since there are two types of printer drivers in the present embodiment, the result of the determination in step 10-3 in the procedure shown in FIG. 10 will always be "appropriate" for a user interface driver that receives an initialization instruction from another user interface driver. Additionally, in this case, the return destination of the driver handle will be the user interface driver that is the transmission source of the initialization instruction.

The application or the graphics engine that receives the driver handle from the user interface driver creates print data using the printer driver (graphics driver) identified by the driver handle, and transmits the print data to the printer. The printer driver hands over graphics data output from the graphics engine to the printer driver for conversion into print data of a predetermined format that is described in PDL, XML or the like, which can be interpreted by a print apparatus.

As a result of the above-described processing, an application can perform actual printing using an appropriate graphics driver. In other words, data output by the graphics engine no longer must be converted into data of a format that is processible by a printer driver. Thus, in the event that a plurality of printer drivers are available for a printer, printing may be performed using a printer driver corresponding to a graphics engine used by an application regardless of which printer driver is selected. As a result, printing speed may be improved, information loss attributable to data conversion may be prevented, and print quality may be enhanced.

[Second Embodiment]

The first embodiment is a printing system in which initialization of a printer driver is performed at the same time a user interface display for print setting is performed from an application. However, this does not necessarily apply to all printing systems. Depending on the specification of an OS, cases may be envisaged in which initialization processing of a printer driver is not performed upon performing user interface display for configuring print settings and the like for a user interface driver. An initialization instruction is issued to a graphics driver of a printer driver upon actually performing print processing. In such a printing system, since an initialization instruction is not issued to a user interface driver, a driver used by an application may not be switched even when the user interface driver performs the processing shown in FIG. 10 of the first embodiment. In this light, the present invention is arranged so that, in response to a user interface display instruction, the user interface driver performs processing for switching to an appropriate driver. System configuration other than the items described below are shared with the first embodiment, and therefore a description thereof will be omitted.

Figure 11:
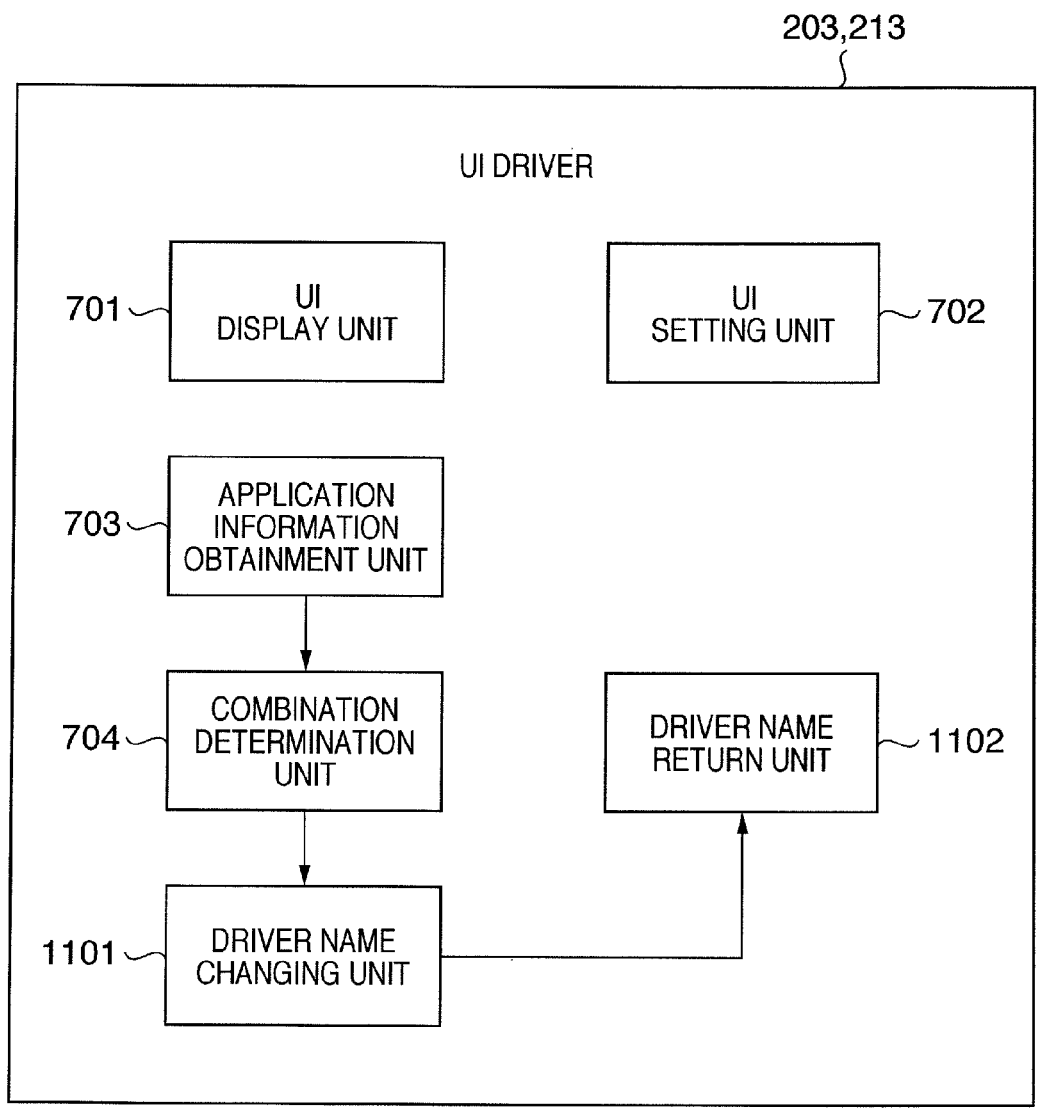
FIG. 11 is a diagram showing a configuration of a user interface driver according to a second embodiment.

FIG. 11 is a diagram that best represents the characteristics of the second invention, and shows configurations of user interface drivers according to the second embodiment. In the printing system according to the second embodiment, the user interface driver does not initialize the driver. Therefore, when compared with FIG. 7 of the first embodiment, the second embodiment does not comprise an initialization unit 707, a driver initialization unit 706 and a driver handle return unit 707. Instead, a driver name changing unit 1101 and a driver name return unit 1102 have been added.

Similar to the first embodiment, a GDI graphics driver 502 and an XPS graphics driver 512 according to the second embodiment do not perform any special processing, and merely operate as general graphics drivers. On the other hand, a GDI user interface driver 203 and an XPS user interface driver 213 or a common user interface driver (hereinafter collectively referred to as user interface driver) perform processing characteristic of the second embodiment.

Upon receiving a setting change instruction from applications 201, 211 or graphics engines 202, 212, the user interface driver according the second embodiment performs user interface display at a user interface display unit 701. A user interface setting unit 702 stores print settings inputted by a user. In response thereto, an application information obtainment unit 703 acquires information on whether the application 201, 211 calling the user interface driver are Win32 applications 201 or WinFx applications 211. The determination processing performed by the application information obtainment unit 703 and a combination determination unit 704 is the same as that performed in the first embodiment.

When the combination determination unit 704 determines that the combination is inappropriate, the driver name changing unit 1101 of the user interface driver hands over a name of an appropriate driver to the application. More specifically, in the present embodiment, this is performed using print setting information (DEVMODE for a GDI user interface driver, Print Ticket for an XPS user interface driver) handed over to the application from the user interface driver. In other words, the driver name changing unit 1101 stores a name of a driver appropriate for the print setting information, and the print setting information is handed over to the application by the driver name return unit 1102.

The application acquires a driver name from the print setting information that was handed over. The application then performs printing using a printer driver having the driver name. This allows the processing paths 352 or 353 to be avoided.

On the other hand, when the combination determination unit 704 determines that the combination is appropriate, no particular operations are performed, and the user interface driver that received the user interface display instruction hands over the print setting information to the application without changing the driver name already stored in the print setting information.

Figure 12:
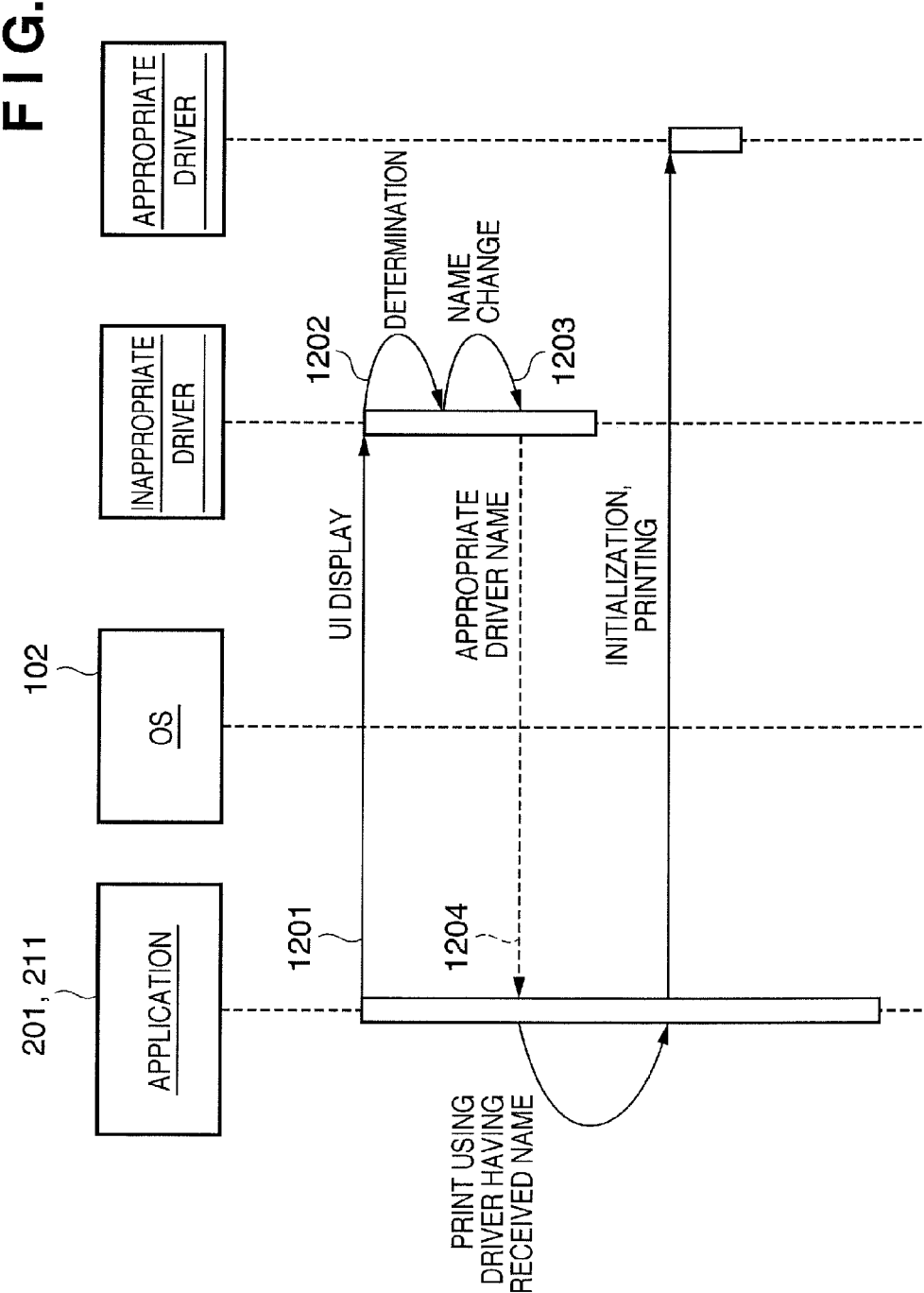
FIG. 12 is a diagram showing a sequence of the user interface driver according to the second embodiment.

FIG. 12 shows a sequence of the user interface driver according to the second embodiment. In step 1201, a user interface display instruction is handed over to the user interface driver by the application. In step 1202, when the combination determination unit 704 determines that the driver is inappropriate, in step 1203, the user interface driver changes the driver name within the print setting information to an appropriate driver name using the driver name changing unit 1101. Then, in step 1204, the user interface driver returns print setting information, which includes the user's user interface settings at a user interface display unit 701 and a user interface setting unit 702, to the application. The application performs print initialization processing and print processing corresponding to the driver name within the print setting information.

Figure 13:
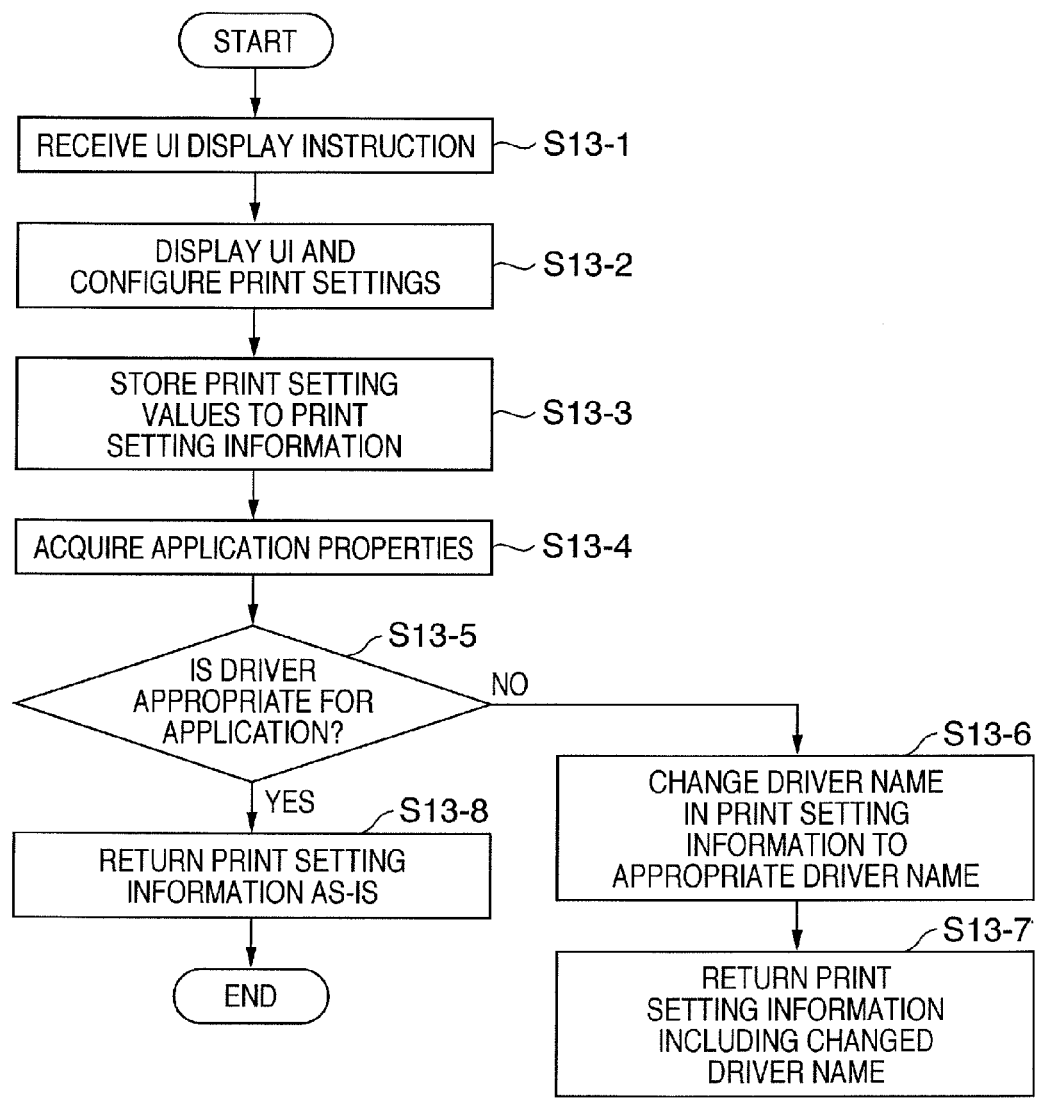
FIG. 13 is a flowchart showing a processing flow of the user interface driver according to the second embodiment when a print setting UI display instruction is handed over to the user interface driver.

FIG. 13 is a flowchart showing a processing flow of the user interface driver according to the second embodiment when a print setting user interface display instruction is handed over to the user interface driver. When printing from the applications 201, 211, the user issues instructions for configuring the print settings of the printer driver to the applications 201, 211. In response thereto, the applications issue a user interface display instruction to a user interface driver of the specified printer driver. The processing flow shown in FIG. 13 is executed by the user interface driver that receives the instruction.

The user interface driver receives the user interface display instruction in step 13-1, performs user interface dialog display in step 13-2 to accept input for changing print settings from the user. Then in step 13-3, the user interface driver stores print setting values input by the user into print setting information.

The user interface driver next acquires a name of the application (executable file name) that called the user interface driver. Based on the name, in step 13-4, the user interface driver acquires type information indicating whether the calling application is a Win32 application or a WinFx application. This processing is similar to that performed in the first embodiment. Based on the acquired application type information, the user interface driver determines in step 13-5 whether the printer driver including the user interface driver is appropriate for the application. If determined to be inappropriate, a driver name item in the print setting information is changed to an appropriate driver name in step 13-6. In step 13-7, print setting information including the changed driver name is returned to the application.

When determined to be appropriate in step 13-5, the user interface driver in step 13-8 returns the print setting information created in step 13-3 as-is to the application.

An appropriate driver name may be obtained by, for instance, additionally associating and registering the driver name to the field to which a printer driver type was registered in the table shown in FIG. 8. For example, a driver name defined as being "appropriate" with respect to the acquired application type is searched. An obtained driver name is a name of a driver that is appropriate for that application. The driver name in the print setting information is substituted with the obtained driver name. The application issues a print initialization instruction to a printer driver having the driver name in the print setting information, and uses that printer driver to perform print processing. As a result, the print processing paths 352 or 353 may be avoided.

In this manner, the present embodiment enables switching of a driver to be used by an application to an appropriate driver even when the application does not issue an initialization instruction to a user interface driver. Therefore, data output by the graphics engine no longer must be converted into data of a format that is processible by a printer driver. As a result, printing speed may be improved, information loss attributable to data conversion may be prevented, and print quality may be enhanced.

[Third Embodiment]

In the second embodiment, drivers may be changed in cases in which an application performs print initialization or print processing based on a driver name contained in print setting information that had been changed by a user interface driver. However, there are cases in which, for instance, the application stores the name of a driver used when calling a user interface driver into a local area, and a driver of the stored driver name is also used during print processing. In such cases, the user interface driver is incapable of changing the driver used by the application.

Figure 14:
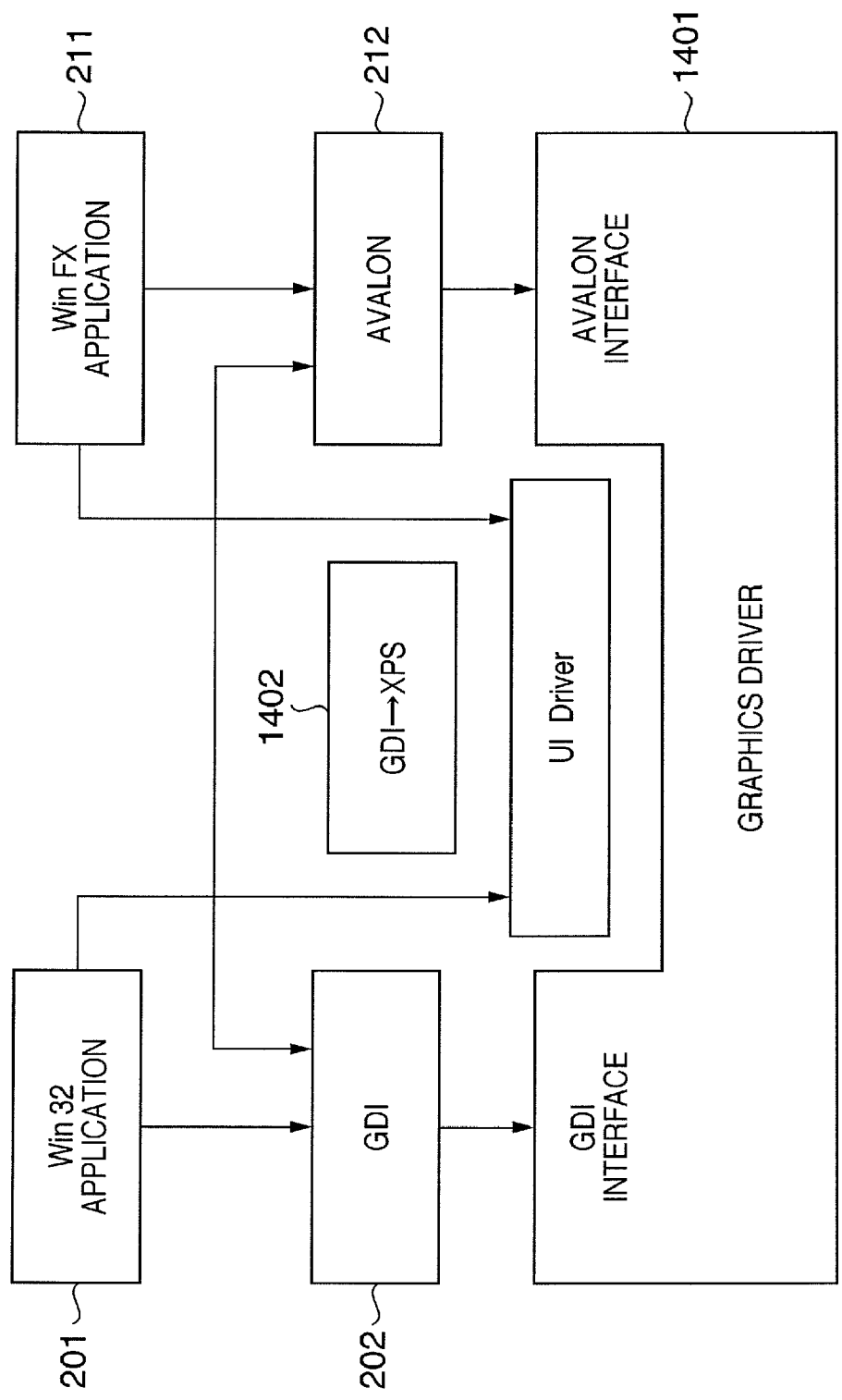
FIG. 14 is a diagram showing a configuration of a driver according to a third embodiment.

In consideration of the above, the third embodiment has been arranged so that, as shown in FIG. 14, a graphics driver 1401 is able to receive both print data from GDI 202 and print data from WPF 212 via a GDI interface and an XPS interface. Therefore, only one user interface driver is provided, which is activated when either interface is used. Then, a change is made to driver properties (type information indicating either a GDI driver or an XPS driver) identified by an OS. In other words, driver properties of a printer driver that is selected as a driver to be used by the application is stored so as to be accessible from the operating system. Based on the driver properties information, determination is made on whether the format of data output from the graphics engine requires conversion.

Figure 15:
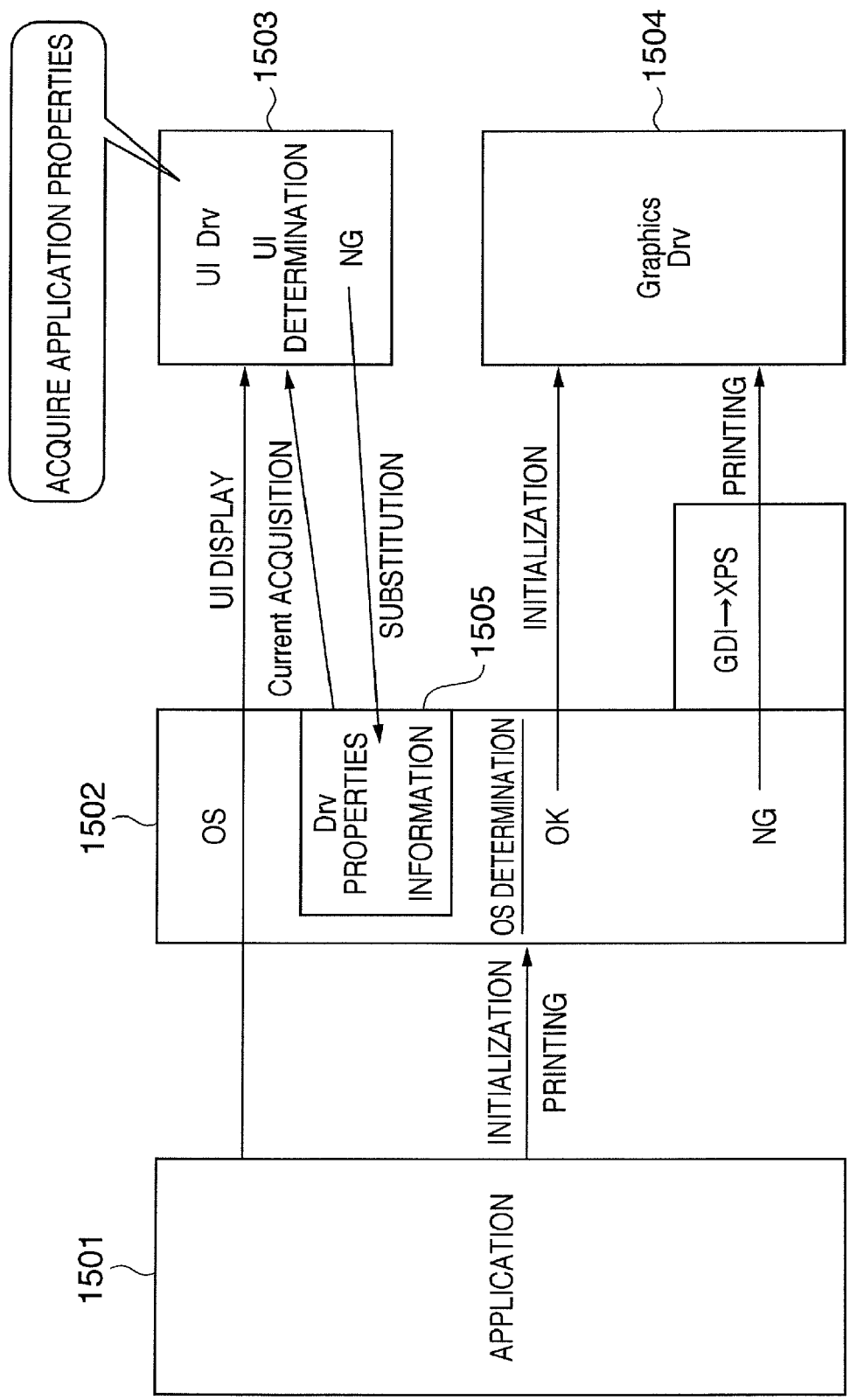
FIG. 15 is a diagram showing a configuration of a driver according to the third embodiment.

FIG. 15 is a schematic diagram showing a configuration in which driver attributes are changed according to the present embodiment. In the present embodiment, properties information of a driver referenced by the operating system is rewritten by a user interface driver 1503. In other words, upon receiving an initialization instruction from an application 1501, the user interface driver 1503 acquires application type information using the same method as in the first embodiment. Next, driver properties information 1505, retained and managed by the operating system, which indicates a driver type and the like, is read and compared to the application type information in order to determine whether the driver properties are appropriate. The table shown in FIG. 8 may be used for this determination, provided that driver properties information is registered in the printer driver field. If appropriate, processing is continued without modification. If not, the driver properties information 1505 referenced by the operating system is changed to a driver properties value of an appropriate printer driver.

Figure 16:
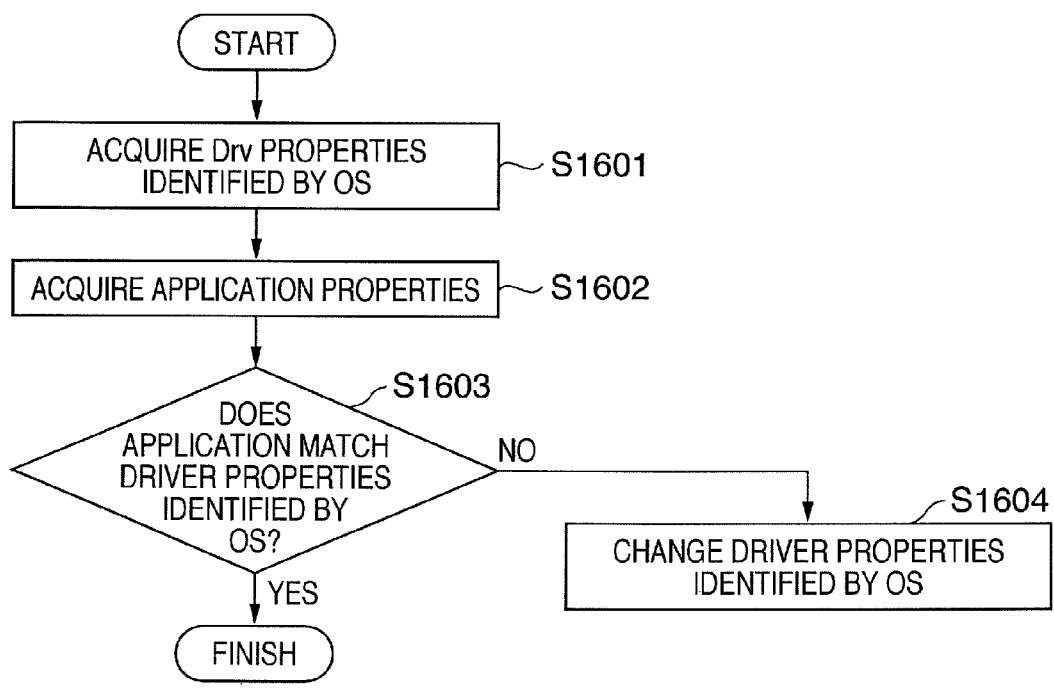
FIG. 16 is a processing flowchart of a user interface driver that has received a print instruction, according to the third embodiment.

FIG. 16 shows a procedure of processing performed by a user interface driver. Upon receiving an initialization instruction, in step 1601, the user interface driver acquire driver properties referenced by the operating system. In step 1602, the user interface driver acquires application type information. In step 1603, a determination is made on whether the application type information and the driver properties information are consistent (match). If not consistent, the driver properties referenced by the operating system is rewritten to driver properties of a driver that is consistent with the application.

As seen, in the present embodiment, information (registry, availability of files and the like) identified by the OS is acquired, and if appropriate, processing by the user interface driver is performed without modification, while if inappropriate, information of the OS indicating driver properties is changed. Therefore, data output by the graphics engine no longer must be converted into data of a format that is processible by a printer driver. As a result, printing speed may be improved, information loss attributable to data conversion may be prevented, and print quality may be enhanced.

In addition, the present invention may be applied to a system comprising a plurality of devices (for example, a host computer, an interface device, a reader or a printer), or apparatuses composed of a single device (for example, a copying machine or facsimile machine). Furthermore, the object of the present invention may also be achieved by supplying a storage media that stores a program code capable of realizing the functions of the above-described embodiments to a system or an apparatus, and having a computer of the system or apparatus read out and execute the program stored in the storage media. In this case, the program code itself that is read out from the storage media achieves the functions of the above mentioned embodiments, while the program code itself and the storage media storing the program code will compose the present invention.

Moreover, the present invention includes configurations in which the function of the aforementioned embodiments are achieved through processing performed by an operating system (OS) or the like, which is running on a computer, that performs a portion or all of the actual processing based on instructions from the program code. In addition, the present invention also applies to cases in which a program code read out from a storage media is written onto a function enhancement card inserted into a computer or a memory built into a function enhancement unit connected to a computer. In such cases, the functions of the aforementioned embodiments may also be achieved by having a CPU or the like built into the function enhancement card or the function enhancement unit perform a portion or all of the actual processing based on instructions from the program code.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2006-075551, filed Mar. 17, 2006, which is hereby incorporated by reference herein in its entirety.

The invention claimed is:

1. An information processing apparatus in which a first graphics processing unit and a second graphics processing unit are operational, wherein the first graphics processing unit outputs first graphics data that is processible by a first type of printer driver in accordance with a print instruction from a first type of application, and the second graphics processing unit outputs second graphics data that is processible by a second type of printer driver in accordance with a print instruction from a second type of application, said information processing apparatus comprising:
  a receiving unit constructed to receive a selecting instruction from a user for selecting a destination printer driver;
  a determination unit constructed to determine, based on a type of the destination printer driver selected by the user and a type of a source application, whether a current combination of the source application and the destination printer driver selected by the user is a first combination of the first type of application and the first type of printer driver or a second combination of the second type of application and the second type of printer driver; and
  a changing unit constructed to automatically change the destination printer driver used by the source application to a printer driver so that the current combination becomes either the first combination or the second combination, in the event that said determination unit determines that the current combination is neither of the first and second combinations,
  wherein the first printer driver and the second printer driver serve for the same printer, and
  wherein at least one processor executes steps stored in a memory to function as at least one of the units.

2. The information processing apparatus according to claim 1, wherein said changing unit changes a driver handle, which is a printer driver name generated in response to an initialization instruction transmitted by the source application to the destination printer driver, to a driver handle of a printer driver that satisfies the combinations.

3. The information processing apparatus according to claim 1, further comprising a storage unit constructed to store print settings input by a user as print setting information,
  wherein said changing unit changes an identifier of the destination printer driver contained in the print setting information to an identifier of a printer driver that satisfies the combinations.

4. An information processing apparatus in which a first graphics processing unit and a second graphics processing unit operate under the management of an operating system, wherein the first graphics processing unit outputs first graphics data that is processible by a first type of printer driver in accordance with a print instruction from a first type of application, and the second graphics processing unit outputs second graphics data that is processible by a second type of printer driver in accordance with a print instruction from a second type of application, and wherein the operating system references printer driver properties to generate graphics data processible by a printer driver of a type that corresponds to the referenced properties, the information processing apparatus comprising:
  a receiving unit constructed to receive a selecting instruction from a user for selecting a destination printer driver;
  a determination unit constructed to determine, based on a type of the destination printer driver selected by the user and a type of a source application, whether a current combination of the source application and the destination printer driver selected by the user is a first combination of the first type of application and the first type of printer driver or a second combination of the second type of application and the second type of printer driver; and
  a changing unit constructed to change the printer driver properties referenced by the operating system to property values so that the current combination becomes either the first combination or the second combination, in the event that said determination unit determines that current combination is neither of the first and second combinations,
  wherein the first printer driver and the second printer driver serve for the same printer, and
  wherein at least one processor executes steps stored in a memory to function as at least one of the units.

5. A method for changing printer drivers in an information processing apparatus in which a first graphics processing unit and a second graphics processing unit are operational, wherein the first graphics processing unit outputs first graphics data that is processible by a first type of printer driver in accordance with a print instruction from a first type of application, and the second graphics processing unit outputs second graphics data that is processible by a second type of printer driver in accordance with a print instruction from a second type of application, said method comprising:
  a receiving step of receiving a selecting instruction from a user for selecting a destination printer driver;
  a determination step of determining, based on a type of a destination printer driver selected by the user and a type of a source application, whether a current combination of the source application and the destination printer driver selected by the user is a first combination of the first type of application and the first type of printer driver or a second combination of the second type of application and the second type of printer driver; and
  a changing step for changing the destination printer driver used by the source application to a printer driver so that the current combination becomes either the first combination or the second combination, in the event that a determination is made in said determination step that the current combination is determined to be neither of the first and second combinations, wherein the first printer driver and the second printer driver serve for the same printer.

6. The method for changing printer drivers according to claim 5, wherein in changing step, a driver handle, which is a printer driver name generated in response to an initialization instruction transmitted by the source application to the destination printer driver, is changed to a driver handle of a printer driver that satisfies the combinations.

7. The method for changing printer drivers according to claim 5, further comprising a storage step for storing print settings inputted by a user as print setting information, wherein in said changing step, an identifier of a printer driver contained in the print setting information is changed to an identifier of a printer driver that satisfies the combinations.

8. A method for changing printer drivers in an information processing apparatus in which a first graphics processing unit and a second graphics processing unit operate under the management of an operating system, wherein the first graphics processing unit outputs first graphics data that is processible by a first type of printer driver in accordance with a print instruction from a first type of application, and the second graphics processing unit outputs second graphics data that is processible by a second type of printer driver in accordance with a print instruction from a second type of application, and wherein the operating system references printer driver properties to generate graphics data processible by a printer driver of a type that corresponds to the referenced properties, said method comprising:

a receiving step of receiving a selecting instruction from a user for selecting a destination printer driver;

a determination step for determining, based on a type of the destination printer driver selected by the user and a type of a source application, whether a current combination of the source application and the destination printer driver selected by the user is a first combination of the first type of application and the first type of printer driver or a second combination of the second type of application and the second type of printer driver; and a changing step for changing the printer driver properties referenced by the operating system to property values so that the current combination becomes either the first combination or the second combination, in the event that a determination is made in said determination step that the current combination is determined to be neither of the first and second combinations, wherein the first printer driver and the second printer driver serve for the same printer.

9. A non-transitory computer readable storage medium that stores a program which is executed by a computer in which a first graphics processing unit and a second graphics processing unit are operational, wherein the first graphics processing unit outputs first graphics data that is processible by a first type of printer driver in accordance with a print instruction from a first type of application, and the second graphics processing unit outputs second graphics data that is processible by a second type of printer driver in accordance with a print instruction from a second type of application, said program enabling said computer to function as:

a receiving unit constructed to receive a selecting instruction from a user for selecting a destination printer driver;

a determination unit constructed to determine, based on a type of the destination printer driver selected by the user and a type of a source application, whether a current combination of the source application and the destination printer driver selected by the user is a first combination of the first type of application and the first type of printer driver or a second combination of the second type of application and the second type of printer driver; and a changing unit constructed to change the destination printer driver used by the source application to a printer driver so that the current combination becomes either the first combination or the second combination, in the event that said determination unit determines that the current combination is neither of the first and second combinations, wherein the first printer driver and the second printer driver serve for the same printer.

10. The storage medium according to claim 9, wherein said changing unit changes a driver handle, which is a printer driver name generated in response to an initialization instruction transmitted by the source application to the destination printer driver, to a driver handle of a printer driver that satisfies the combinations.

11. The storage medium according to claim 9, further enabling the computer to function as a storage unit constructed to store print settings inputted by a user as print setting information, wherein said changing unit changes an identifier of a printer driver contained in the print setting information to an identifier of a printer driver that satisfies the combinations.

12. A non-transitory computer readable storage medium that stores a program which is executed by a computer in which a first graphics processing unit and a second graphics processing unit operate under the management of an operating system, wherein the first graphics processing unit outputs first graphics data that is processible by a first type of printer driver in accordance with a print instruction from a first type of application, and the second graphics processing unit outputs second graphics data that is processible by a second type of printer driver in accordance with a print instruction from a second type of application, and wherein the operating system references printer driver properties to generate graphics data processible by a printer driver of a type that corresponds to the referenced properties, said program enabling said computer to function as:

a receiving unit constructed to receive a selecting instruction from a user for selecting a destination printer driver;

a determination unit constructed to determine, based on a type of the destination printer driver selected by the user and a type of a source application, whether a current combination of the source application and the destination printer driver selected by the user is a first combination of the first type of application and the first type of printer driver or a second combination of the second type of application and the second type of printer driver; and a changing unit constructed to change the printer driver properties referenced by the operating system to property values so that the current combination becomes either the first combination or the second combination, in the event that said determination unit determines that current combination is neither of the first and second combinations, wherein the first printer driver and the second printer driver serve for the same printer.

13. An information processing apparatus in which a first graphics processing unit and a second graphics processing unit are operational, wherein the first graphics processing unit outputs first graphics data that is processible by a first type of printer driver in accordance with a print instruction from a first type of application, and the second graphics processing unit outputs second graphics data that is processible by a second type of printer driver in accordance with a print instruction from a second type of application, said information processing apparatus comprising:

a receiving unit constructed to receive a selecting instruction from a user for selecting a destination printer driver;

a determination unit constructed to determine, based on a type of the destination printer driver selected by the user and a type of a source application, whether a current combination of the source application and the destination printer driver selected by the user is a first combination of the first type of application and the second type of printer driver or a second combination of the second type of application and the first type of printer driver; and a changing unit constructed to change the destination printer driver used by the source application to a printer driver so that the current combination becomes neither the first combination nor the second combination, in the event that said determination unit determines that the current combination is either the first combination or the second combination, wherein the first printer driver and the second printer driver serve for the same printer, and wherein at least one processor executes steps stored in a memory to function as at least one of the units.

14. A method of controlling an information processing apparatus in which a first graphics processing unit and a second graphics processing unit are operational, wherein the first graphics processing unit outputs first graphics data that is processible by a first type of printer driver in accordance with a print instruction from a first type of application, and the second graphics processing unit outputs second graphics data that is processible by a second type of printer driver in accordance with a print instruction from a second type of application, said method comprising:

a receiving step of receiving a selecting instruction from a user for selecting a destination printer driver;

a determination step of determining, based on a type of the destination printer driver selected by the user and a type of a source application, whether a current combination of the source application and the destination printer driver selected by the user is a first combination of the first type of application and the second type of printer driver or a second combination of the second type of application and the first type of printer driver; and a changing step of changing the destination printer driver used by the source application to a printer driver so that the current combination becomes neither the first combination nor the second combination, in the event that said determination step determines that the current combination is either the first combination or the second combination, wherein the first printer driver and the second printer driver serve for the same printer.

15. A non-transitory computer readable storage medium in which a program to be executed by a computer is stored for causing a computer to execute a method of controlling a computer in which a first graphics processing unit and a second graphics processing unit are operational, wherein the first graphics processing unit outputs first graphics data that is processible by a first type of printer driver in accordance with a print instruction from a first type of application, and the second graphics processing unit outputs second graphics data that is processible by a second type of printer driver in accordance with a print instruction from a second type of application, said method comprising:

a receiving step of receiving a selecting instruction from a user for selecting a destination printer driver;

a determination step of determining, based on a type of the destination printer driver selected by the user and a type of a source application, whether a current combination of the source application and the destination printer driver selected by the user is a first combination of the first type of application and the second type of printer driver or a second combination of the second type of application and the first type of printer driver; and a changing step of changing the destination printer driver used by the source application to a printer driver so that the current combination becomes neither the first combination nor the second combination, in the event that said determination step determines that the current combination is either the first combination or the second combination, wherein the first printer driver and the second printer driver serve for the same printer.

* * * * *